United States Patent [19]
Kato et al.

[11] Patent Number: 5,978,109
[45] Date of Patent: Nov. 2, 1999

[54] SUPERRESOLUTION SCANNING OPTICAL DEVICE

[76] Inventors: Makoto Kato, 10-43 Matsuzono-cho, Nishinomiya-shi, Hyogo 662; Kenichi Kasazumi, 2-6-2 Hiyoshidai, Takatsuki-shi, Osaka 569, both of Japan

[21] Appl. No.: 09/021,398

[22] Filed: Feb. 10, 1998

Related U.S. Application Data

[62] Division of application No. 08/571,558, Dec. 13, 1995, abandoned, which is a division of application No. 08/034,754, Mar. 18, 1993, Pat. No. 5,496,995.

[30] Foreign Application Priority Data

Mar. 19, 1992 [JP] Japan .................................. 4-063761

[51] Int. Cl.⁶ .............................. G02B 5/32; G02B 27/46; G11B 7/00
[52] U.S. Cl. .............................. 359/15; 359/29; 359/558; 359/559; 359/562; 369/112
[58] Field of Search ................................... 359/15, 16, 17, 359/29, 558, 559, 562; 369/112

[56] References Cited

U.S. PATENT DOCUMENTS

| | | | |
|---|---|---|---|
| 3,746,455 | 7/1973 | Flamholz | 359/558 |
| 4,699,465 | 10/1987 | Rice et al. | 359/558 |
| 4,929,823 | 5/1990 | Kato et al. | 250/201.5 |
| 4,947,413 | 8/1990 | Jewell et al. | 359/559 |
| 5,111,312 | 5/1992 | Stewart | 359/562 |
| 5,121,378 | 6/1992 | Hirose et al. | 369/112 |
| 5,231,624 | 7/1993 | Finegan | 369/118 |
| 5,317,557 | 5/1994 | Goto | 369/112 |
| 5,349,592 | 9/1994 | Ando | 369/112 |
| 5,450,237 | 9/1995 | Yoshida et al. | 359/562 |

FOREIGN PATENT DOCUMENTS

| | | | |
|---|---|---|---|
| 0 116 896 | 8/1984 | European Pat. Off. | G02B 27/00 |
| 0 310 711 | 4/1989 | European Pat. Off. | G02B 27/00 |
| 0 401 764 | 12/1990 | European Pat. Off. | G11B 7/135 |
| 0 476 931 | 3/1992 | European Pat. Off. | G02B 5/18 |
| 1-94541 | 4/1989 | Japan . | |
| 1-94542 | 4/1989 | Japan . | |
| WO 88/02536 | 4/1988 | WIPO | 359/558 |

OTHER PUBLICATIONS

Watson, et al., "Sidelobe Reduction via Multiaperture Optical Systems", Applied Optics, vol. 28, No. 4, pp. 687–693, Feb. 1989.

Yamanaka, et al., "High Density Recording by Superresolution in Optical Disk Memory System", Applied Optics, vol. 29, No. 20, pp. 3046–3051, Jul. 1990.

Jars Turunen, et al., "Holographic Generation of Diffraction–Free Beams", Applied Optics, vol. 27, No. 19, pp. 3959–3962, Oct. 1988.

I.J. Cox, et al., "Reappraisal of Arrays of Concentric Annuli as Superresolving Filters", J. Opt. Soc. America, JOSA Letters, vol. 72, No. 9, pp. 1287–1291, Sep. 1982.

G.J> Swanson, et al., "Binary Optics Technology: The Theory and Design of Multi–Level Diffractive Optical Elements", Technical Report 854, M.I.T. Lincoln Laboratory, Lexington, Massachusetts, pp. 13–15, Aug. 1989.

Kato et al., "Recent Advances In Optical Pickup Head With Holographic Optical Elements", Holographic Optics III: Principles and Applications vol. 1507, Mar. 11–15, 1991, The Hague, The Netherlands.

*Primary Examiner*—Thong Nguyen
*Assistant Examiner*—John Juba, Jr.

[57] ABSTRACT

A superresolution scanning optical device has image forming means for forming the image of light from a coherent light source unit in the form of a fine spot on a conjugate face through an image forming optical system, and scanning means for scanning the fine spot formed on the conjugate face. The coherent light source unit has first and second light sources of which phases are reverse to each other. The first and second light sources have the relationship that the main lobe of the image of the second light source on the conjugate face is superposed on the lateral sides of the main lobe of the image of the first light source on the conjugate face.

20 Claims, 19 Drawing Sheets

FIG. 9
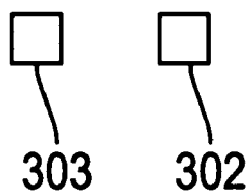  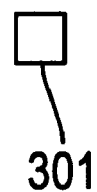  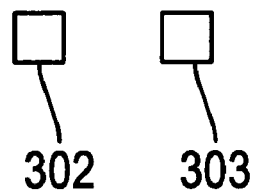

SUPERRESOLUTION SCANNING OPTICAL DEVICE

This is a divisional application of Ser. No. 08/571,558, filed Dec. 13, 1995, now abandoned which is a divisional of Ser. No. 08/034,754, filed Mar. 18, 1993 and now U.S. Pat. No. 5,496,995

BACKGROUND OF THE INVENTION

The present invention relates to (i) a superresolution scanning optical device, a laser scanning microscope, a bar-code scanner and a laser printer in each of which an object is scanned by a focused beam to optically process the information, (ii) an image forming optical device such as a disc device which has no scanning means but uses a semi-coherent illumination, (iii) a stepper optical device used in a semiconductor producing process, and (iv) a superresolution light source device and a superresolution filter to be used in any of the optical devices above-mentioned.

The superresolution scanning optical device has scanning means for scanning a line or a space with a coherent beam focused in the form of a fine spot, and converting means for photoelectrically converting the light intensity of the scanned beams. In a scanning and photoelectrically converting optical system, there are proposed a variety of arrangements for effectively obtaining a fine spot equal to or smaller than the diffraction limit.

FIG. 19 schematically shows a conventional optical pickup head H proposed for effecting superresolution in an optical disk system ["High Density Optical Recording by Superresolution", Y. Yamanaka, Y. Hirose and K. Kubota, Proc. Int. Symp. on Optical Memory, 1989. Jap. J. of Appl. Phys., Vol. 28 (1989) supplement 28-3, pp. 197–200].

As shown in FIG. 19, a coherent beam emitted from a light emitting point 10a from a coherent light source 10 comprising a semiconductor laser light source, passes through a collimate lens 12, thus causing the coherent beam to be converted into parallel beam portions, each of which is then divided into two portions by a double loam prism 14. These beam portions penetrate a first beam splitter 16 and a second beam splitter 18, and are then focused in the form of a superresolution spot on a magneto-optical medium 22 by an objective lens 20.

In a returning path, beam portions as divided and reflected by the second beam splitter 18, transmit a condenser lens 24 and are intercepted at the side lobes thereof by a slit 26. Then, the beam portions transmit a condenser lens 28 and a Wollaston polarizing prism 30, and reach a first photodetector 32, where the beam portions are photoelectrically converted and read in terms of an electrical signal. Beam portions as divided and passed through the second beam splitter 18, penetrate a condenser lens 34, and each beam portion is further divided into two portions by a third beam splitter 36. These two portions respectively reach a second photodetector 38 and a third photodetector 40, where servo signals for focusing and tracking are detected.

In FIG. 19, a knife edge 42 is disposed for cutting an edge of a beam portion which has penetrated the third beam splitter 36, and an actuator 43 is disposed for driving the objective lens 20.

FIG. 20 shows the principle of superresolution used in the optical pickup head H shown in FIG. 19. More specifically, two beams emitted from the double loam prism 14 in FIG. 19 are equivalent to beams diffracted from two openings 44a, 44b formed in a light intercepting plate 44 in FIG. 20, and present an intensity distribution I(x) shown by a solid line on an image forming plate 46 (X-axis). A dotted line in FIG. 20 shows an intensity distribution $I_0(x)$ which would be obtained when either the opening 44a or 44b is present alone. It is well known that, since diffraction images from the openings 44a, 44b interfere with each other, there is formed an image of intensity distribution I(x) as shown by the solid line. In this case, the shape of each of the openings 44a, 44b (corresponding to the shape of the light emitting face of the Wollaston polarizing prism 30 in FIG. 19) may be in the form of a slit or a ring.

In reading and scanning in an optical disc device, a signal is to be detected at a photoelectrically converting face. Accordingly, only filtering using a slit is practically available, and there is not used a two-dimensional superresolution effect produced by the use of an annular opening. To restrain a cross talk due to two side lobes ($X=-X_1$, $X=X_1$) appearing on the image forming face 46 in FIG. 20, the slit 26 as shown in FIG. 19 is disposed. As to such a superresolution optical system, a variety of examples are proposed also in the field of a scanning optical microscope. In such an optical system, slit-like or annular openings are formed in a face equivalent to the opening face of the objective lens 20, and a predetermined phase and a predetermined amplitude transmissivity are given to each of the areas to obtain a fine spot smaller than of the diffraction limit determined by the maximum opening of the objective lens 20.

When slit-like or annular openings are formed in a face equivalent to the opening face of the objective lens 20 as above-mentioned, superresolution smaller than the diffraction limit can be obtained with the side lobes restrained to a certain extent. However, such an arrangement presents the following problems. That is, since the amount of light reaching the image forming face is remarkably decreased, the amount of light in the main lobe is decreased. Since there are formed the openings for restraining the side lobes, the optical system is required to be adjusted with precision. Since extra light paths are required, the optical system is complicated in arrangement.

In view of the foregoing, the present invention is proposed with the object of providing a simple optical system capable of obtaining superresolution smaller than of the diffraction limit without the amount of light in the main lobe remarkably decreased.

SUMMARY OF THE INVENTION

A first superresolution scanning optical device according to the present invention comprises image forming means for forming the image of light from a coherent light source unit in the form of a fine spot on a conjugate face through an image forming optical system, and scanning means for scanning the fine spot formed on the conjugate face, the coherent light source unit having at least first and second light sources of which phases are reverse to each other, the first and second light sources having the relationship that the main lobe of the image of the second light source on the conjugate face is superposed on the lateral sides of the main lobe of the image of the first light source on the conjugate face.

Accordingly, the amplitudes of the lateral sides of the main lobe of the image of the first light source are cancelled by the amplitude of the main lobe of the image of the second light source, thus reducing the width of the main lobe of the image of the first light source. It is therefore possible to obtain superresolution smaller than the diffraction limit without slit-like or annular openings formed. Thus, with a simple optical system, superresolution can be achieved without the amount of light of the main lobe remarkably decreased.

In the first superresolution scanning optical device, the coherent light source unit may further include a third light source presenting the same phase as that of the first light source, and the second and third light sources may have the relationship that the main lobe of the image of the third light source on the conjugate face is superposed on the lateral sides of the main lobe of the image of the second light source on the conjugate face. In such an arrangement, that remaining portion of the reverse phase component of the image of the second light source which has not been cancelled in the interference of the phase component of the image of the first light source with the reverse phase component of the image of the second light source, is cancelled by the regular phase component of the image of the third light source. This reduces the amplitudes of the sub-lobes of the intensity distribution formed by the interference of the image of the first light source with the image of the second light source.

A first superresolution light source device for optical device according to the present invention comprises at least first and second light sources which are coherent with each other and which are reverse in phase, the first light source being disposed on the optical axis of an image forming optical system or in the vicinity of this optical axis, and the second light source being disposed in the vicinity of the first light source.

Accordingly, the amplitudes of the lateral sides of the main lobe of the image of the first light source are cancelled by the amplitude of the main lobe of the image of the second light source. This reduces the width of the main lobe of the image of the first light source. It is therefore possible to obtain superresolution smaller than the diffraction limit without slit-like or annular openings for restraining the side lobes formed. Thus, superresolution can be achieved without the amount of light of the main lobe decreased.

In the first superresolution light source device for optical device above-mentioned, provision may be made such that the second light source is smaller in output than the first light source. In such an arrangement, there may be reduced the amplitude of that remaining portion of the reverse phase component of the image of the second light source which has not been cancelled in the interference of the phase component of the image of the first light source with the reverse phase component of the image of the second light source. This may reduce the amplitudes of the sub-lobes of the intensity distribution formed by the interference of the image of the first light source with the image of the second light source.

The first superresolution light source device for optical device above-mentioned may further comprise a third light source which is coherent with the second light source and which has a phase reverse to that of the second light source, the third light source being located in the vicinity of and at the opposite side of the second light source with respect to the first light source. In such an arrangement, there may be reduced the amplitude of the sub-lobes of the remaining portion of the intensity distribution which has not been cancelled in the interference of the image of the first light source with the image of the second light source.

In the first superresolution light source device for optical device above-mentioned, provision may be made such that the second light source is smaller in output than the first light source, and that the third light source is smaller in output than the second light source. This may further reduce the amplitudes of the sub-lobes of the intensity distribution formed by the interference of the images of the first and second light sources with each other.

A second superresolution light source device for optical device comprises a coherent light source for emitting a coherent beam, and a phase plate disposed in the vicinity of and opposite to a beam emitting part of the coherent light source for emitting a coherent beam, the phase plate having a first phase area for imparting a predetermined phase to a first area which is the center of a coherent beam emitted from the beam emitting part, and a second phase area for imparting a phase reverse to the predetermined phase to a second area outside of the first area of the coherent beam emitted from the beam emitting part.

Accordingly, the amplitudes of the lateral sides of the main lobe of the image of light having passed through the first phase area, are cancelled by the amplitude of the main lobe of the image of light having passed through the second phase area, thus reducing the amplitude of the main lobe of the image of the light having passed through the first phase area. It is therefore possible to obtain superresolution smaller than the diffraction limit without slit-like or annular openings formed. Thus, superresolution may be achieved without the amount of light of the main lobe remarkably decreased.

In the second superresolution light source device for optical device above-mentioned, the phase plate may be arranged such that an output of the second area of a coherent beam emitted from the beam emitting part is smaller than an output of the first area of the coherent beam. In such an arrangement, the output of light having passed through the second phase area may be smaller than that of light having passed through the first phase area. Accordingly, there is reduced the amplitude of that remaining portion of the reverse phase component of the image of light having passed through the second phase area which has not been cancelled in the interference of the phase component of the image of light having passed through the first phase area with the reverse phase component of the image of the light having passed through the second phase area. This may reduce the amplitudes of the sub-lobes of the intensity distribution formed by the interference of the image of the light having passed through the first phase area with the image of the light having passed through the second phase area.

In the second superresolution light source device for optical device above-mentioned, the first phase area of the phase plate may be circular and the second phase area of the phase plate may be annular, or the first phase area of the phase plate may be rectangular and the second phase area of the phase plate may be made in the form of a rectangular frame.

In the second superresolution light source device for optical device above-mentioned, the phase plate may have a third phase area which imparts a phase reverse to that of the second phase area, to a third area outside of the second area of a coherent beam emitted from the beam emitting part. In such an arrangement, that remaining portion of the reverse phase component of the image of light having passed through the second phase area which has not been cancelled in the interference of the phase component of the image of light having passed through the first phase area with the reverse phase component of the image of the light having passed through the second phase area, may be cancelled by the regular phase component of the image of light having passed through the third phase area. This may reduce the amplitudes of the sub-lobes of the intensity distribution formed by the interference of the image of the light having passed through the first phase area with the image of the light having passed through the second phase area.

In the second superresolution light source device for optical device above-mentioned, the phase plate may be arranged such that an output of the third area of a coherent beam emitted from the beam emitting part is smaller than an output of the second phase area of the coherent beam. In such an arrangement, there may be further reduced the amplitudes of the sub-lobes of the intensity distribution formed by the interference of the image of light having passed through the first phase area with the image of light having passed through the second phase area.

In the second superresolution light source device for optical device above-mentioned, the third phase area of the phase plate is preferably annular when the first phase area of the phase plate is circular and the second phase area is annular.

In the second superresolution light source device for optical device above-mentioned, the third phase area of the phase plate is preferably made in the form of a rectangular frame when the first phase area of the phase plate is rectangular and the second phase area is made in the form of a rectangular frame.

A first superresolution filter for optical device according to the present invention comprises a holographic optical element which has a hologram recorded on the surface thereof, the hologram presenting the waves of phase row light sources including first and second light sources from which lights are emitted in the form of waves of which phases are reverse to each other, the hologram being arranged such that, when diffracted light from the hologram is focused, a main lobe formed by the second light source is superposed on the lateral sides of a main lobe formed by the first light source.

Accordingly, in spite of the use of a single point light source, there can be holographically achieved superresolution equivalent to that obtained by the first superresolution light source device for optical device having the first and second light sources mentioned earlier.

A second superresolution filter for optical device in accordance with the present invention comprises a holographic optical element which has a hologram recorded on the surface thereof, the hologram presenting the waves of phase row light sources including first and second light sources from which lights are emitted in the form of waves of which phases are reverse to each other, and a third light source presenting a phase reverse to that of the second light source, the hologram being arranged such that, when diffracted light from the hologram is focused, a main lobe formed by the second light source is superposed on the lateral sides of a main lobe formed by the first light source, and a main lobe formed by the third light source is superposed on the lateral sides of a main lobe formed by the second light source.

Accordingly, in spite of the use of a single point light source, there can be holographically achieved superresolution equivalent to that obtained by the first superresolution light source device for optical device having the first, second and third light sources mentioned earlier.

A third superresolution filter for optical device comprises a holographic optical element which has a computer-synthesized hologram recorded on the surface thereof, the computer-synthesized hologram presenting the waves of phase row light sources including first and second light sources from which lights are emitted in the form of waves of which phases are reverse to each other, the waves being calculated as an inline-type Fourier transform hologram, the computer-synthesized hologram being arranged such that, when diffracted light from the hologram is focused, a main lobe formed by the second light source is superposed on the lateral sides of a main lobe formed by the first light source.

Accordingly, in spite of the use of a single point light source, there can be achieved, by the computer-synthesized hologram, superresolution equivalent to that obtained by the first superresolution light source device for optical device having the first and second light sources mentioned earlier.

A fourth superresolution filter for optical device according to the present invention comprises a holographic optical element which has a computer-synthesized hologram recorded on the surface thereof, the hologram presenting the waves of phase row light sources including first and second light sources from which lights are emitted in the form of waves of which phases are reverse to each other, and a third light source presenting a phase reverse to that of the second light source, the waves being calculated as an inline-type Fourier transform hologram, the computer-synthesized hologram being arranged such that, when diffracted light from the hologram is focused, a main lobe formed by the second light source is superposed on the lateral sides of a main lobe formed by the first light source, and a main lobe formed by the third light source is superposed on the lateral sides of a main lobe formed by the second light source.

Accordingly, in spite of the use of a single point light source, there can be achieved, by the computer-synthesized hologram, superresolution equivalent to that obtained by the first superresolution light source device for optical device having the first, second and third light sources mentioned earlier.

A second superresolution scanning optical device comprises a coherent light source, focusing means having a collimate lens for focusing a coherent beam emitted from the coherent light source on a recording surface of an optical disc, and control means for controlling the relative position of the focusing means with respect to the recording surface of the optical disc, the collimate lens having, in a unitary structure, any of the first to fourth superresolution filters for optical device above-mentioned.

Accordingly, with the use of a single point light source, there can be readily obtained a superresolution scanning optical device by which the amount of light of the main lobe of the light source image is not remarkably reduced.

A third superresolution scanning optical device according to the present invention comprises a coherent light source, focusing means having an objective lens for focusing a coherent beam emitted from the coherent light source on a recording surface of an optical disc, and control means for controlling the relative position of the focusing means with respect to the recording surface of the optical disc, the objective lens having, in a unitary structure, any of the first to fourth superresolution filters for optical device above-mentioned.

Accordingly, with the use of a single point light source, there can be readily obtained a superresolution scanning optical device by which the amount of light of the main lobe of the light source image is not remarkably reduced.

A fourth superresolution scanning optical device according to the present invention comprises a coherent light source and focusing means having a collimate lens, a polygon mirror and a focusing lens for focusing a coherent beam emitted from the coherent light source, the collimate lens having, in a unitary structure, any of the first to fourth superresolution filters for optical device above-mentioned.

Accordingly, with the use of a single point light source, there can be readily obtained a superresolution scanning optical device in which a coherent beam emitted from the coherent light source is focused through the polygon mirror so that the amount of light of the main lobe of the light source image is not remarkably reduced.

A fifth superresolution scanning optical device according to the present invention comprises a coherent light source and focusing means having a collimate lens, a polygon mirror and a focusing lens for focusing a coherent beam emitted from the coherent light source, the focusing lens having, in a unitary structure, any of the first to fourth superresolution filters for optical device above-mentioned.

Accordingly, with the use of a single point light source, there can be obtained a superresolution scanning optical device in which a coherent beam emitted from the coherent light source is focused through the polygon mirror so that the amount of light of the main lobe of the light source image is not remarkably reduced.

BRIEF DESCRIPTION OF THE DRAWINGS

FIG. 9 shows a layout of light source rows used in the optical pickup head system in the superresolution scanning optical device in accordance with each of the first and second embodiments of the present invention;

DETAILED DESCRIPTION OF THE INVENTION

Figure 1:
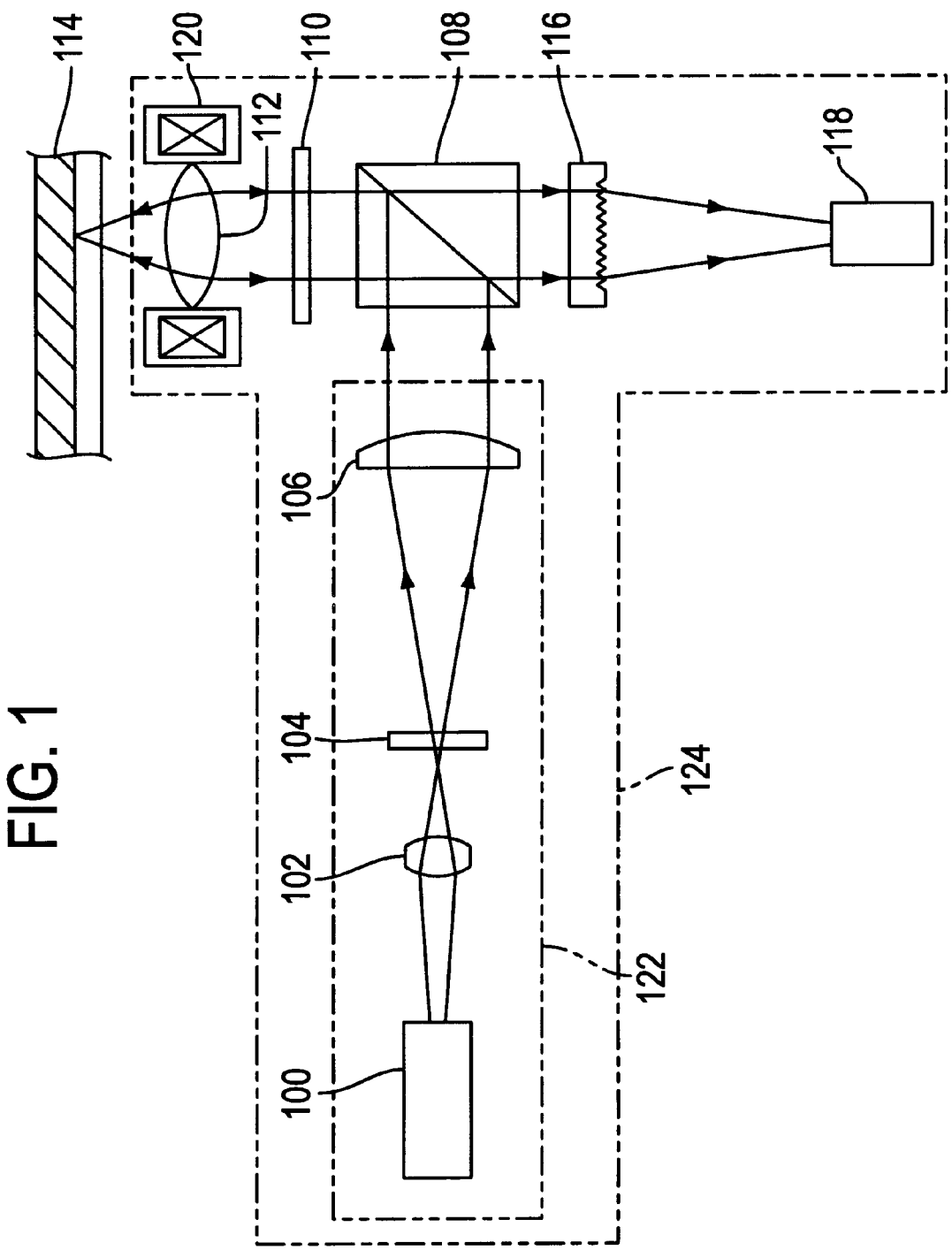
FIG. 1 is a schematic view illustrating the arrangement of an optical pickup head system in a superresolution scanning optical device in accordance with a first embodiment of the present invention.

FIG. 1 schematically shows the arrangement of an optical pickup head system in a superresolution scanning optical device in accordance with a first embodiment of the present invention.

As shown in FIG. 1, light emitted from a coherent light source 100 such as a semiconductor laser, is focused on a phase plate 104 by a focusing lens 102, and then passes a collimate lens 106. Then, the light is reflected by a polarized beam splitter 108 and passed through a quarter wave plate 110, and is guided to an objective lens 112 and reaches an optical disc 114, where the image of the light is formed on a pit face thereof. In a returning path, the light which has passed through the objective lens 112, the quarter wave plate 110 and the polarized beam splitter 108, impinges into a servo signal detecting holographic optical element (See Japanese Patent Laid-Open Publication No. 1-92541, Japanese Patent Laid-Open Publication No. 1-94542 and U.S. Pat. No. 4,929,823) 116 which achieves a spot size detection (SSD) method and a push-pull method for detecting a focusing signal and a tracking signal. Then, the light reaches a photodetector 118. In FIG. 1, an actuator 120 is disposed for driving the objective lens 112.

The coherent light source 100, the focusing lens 102, the phase plate 104 and the collimate lens 106 which have been discussed above, form a superresolution light source device 122. The superresolution light source device 122, the polarized beam splitter 108, the quarter wave plate 110, the objective lens 112, the servo signal detecting holographic optical element 116 and the photodetector 118 form a light pickup head device 124.

Figure 2A:
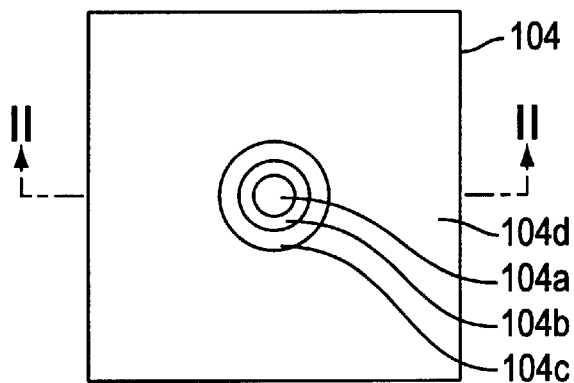
FIG. 2 shows a phase plate used in the optical pickup head system in the superresolution scanning optical device in accordance with the first embodiment of the present invention, in which (a) is a front view thereof and (b) is a section view taken along the line II—II in FIG. 2(a)
Figure 2B:
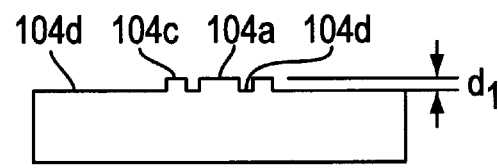
Figure 3:
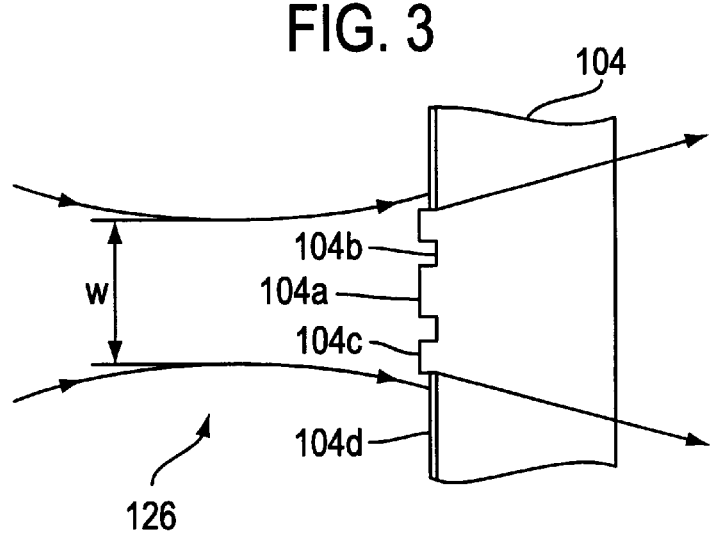
FIG. 3 is a view illustrating a beam waist in the vicinity of a phase plate used in the optical pickup head system in the superresolution scanning optical device in accordance with the first embodiment of the present invention.

FIG. 2(a) shows the arrangement in front elevation of the phase plate 104, while FIG. 2(b) shows the arrangement thereof in section taken along the line II—II in FIG. 2(a). FIG. 3 shows the state of a beam waist 126 (waist diameter: w) in the vicinity of the phase plate 104.

The phase plate 104 has an annular phase structure. The phase plate 104 is provided on the surface thereof with a center zone 104a which comprises a circular convex and which serves as a first phase area, an intermediate zone 104b which comprises an annular concave formed outside of the center zone 104a and which serves as a second phase area, and an outer zone 104c which comprises an annular convex formed outside of the intermediate zone 104b and which serves as a third phase area. An opaque layer 104d is formed outside of the outer zone 104c on the surface of the phase plate 104. The center zone 104a and the outer zone 104c have the same height. Formed between the intermediate zone 104b and each of the center zone 104a and the outer zone 104c is a difference in level $d_1$ for generating a phase difference $\pi$ between transmitted lights each having a wavelength $\lambda$. This difference in level $d_1$ is given by the following equation:

$$d_1 = \lambda/(2 \times (n-1))$$

wherein n is the refractive index of the phase plate 104.

With the arrangement above-mentioned, out of light emitted from the coherent light source 100, a light portion which passes through the intermediate zone 104b and a light portion which passes the center zone 104a, are reverse in phase to each other, while a light portion which transmits the outer zone 104c and a light portion which transmits the intermediate zone 104b, are reverse in phase to each other.

Figure 4:
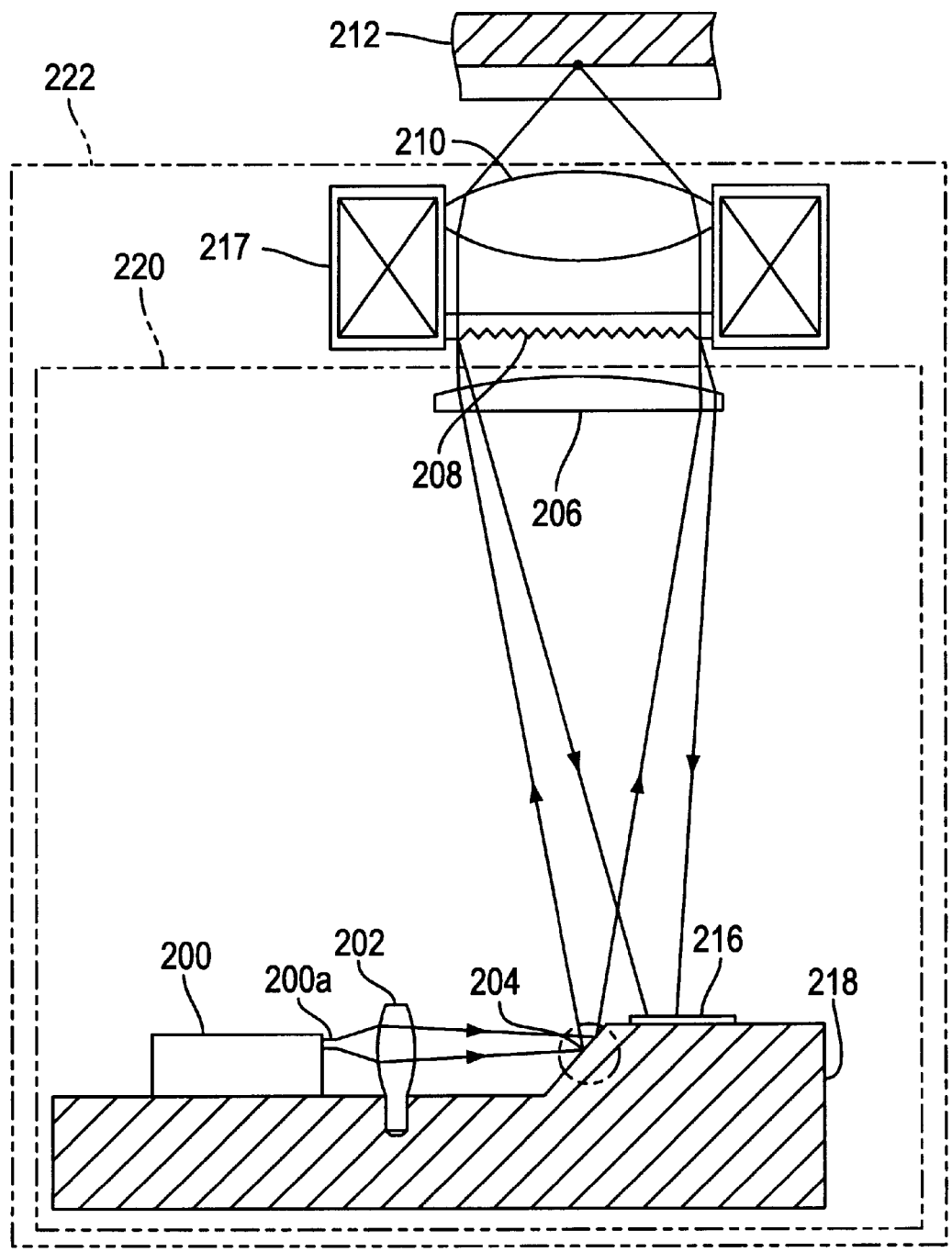
FIG. 4 is a schematic view illustrating the arrangement of an optical pickup head system in a superresolution scanning optical device in accordance with a second embodiment of the present invention.

FIG. 4 schematically shows the arrangement of an optical pickup head system in a superresolution scanning optical device in accordance with a second embodiment of the present invention. The basic arrangement of this optical pickup head system is shown by ["Recent advances in optical pickup head with holographic optical elements", M. Kato et al., Proc. SPIE vol. 1507, pp. 4, ECO'91, Holographic Optics III: Principles and Applications, Mar. 11–15 1991, The Hague, The Netherlands].

As shown in FIG. 4, light emitted from an emission point 200a (an active layer emission face having a slit-like opening formed in a semiconductor laser) of a coherent light source 200, is focused on a reflexion-type phase plate 204 by a condenser lens 202. Then, the light passes a collimate lens 206 and a servo signal detecting holographic optical element 208 similar to that used in the first embodiment. The light is then guided to an objective lens 210 and reaches an optical disc 212, where the image of the light is formed on a pit face thereof. In a returning path, the light which has passed the objective lens 210, the servo signal detecting holographic optical element 208 and the collimate lens 206, reaches a photodetector 216. In FIG. 4, an actuator 217 is disposed for driving the servo signal detecting holographic optical element 208 and the objective lens 210, and there is also disposed a base stand 218 on which the coherent light source 200, the reflexion-type phase plate 204 and the photodetector 216 are integrally placed.

A superresolution light source and signal detecting device 220 is formed in an integrated manner by the coherent light source 200, the focusing lens 202, the reflexion-type phase plate 204, the collimating lens 206 and the photodetector 216 which have been discussed in the foregoing. An optical pickup head device 222 is formed in an integrated manner by the superresolution light source and signal detecting device 220, the servo signal detecting holographic optical element 208 and the objective lens 210.

In the integrated-type optical pickup head device 222, it may be advantageous in view of miniaturization of the entire device and easy circuit mounting that the coherent light source 200 has an arrangement of the surface emission type or an arrangement equivalent to the surface emission type.

Figure 5:
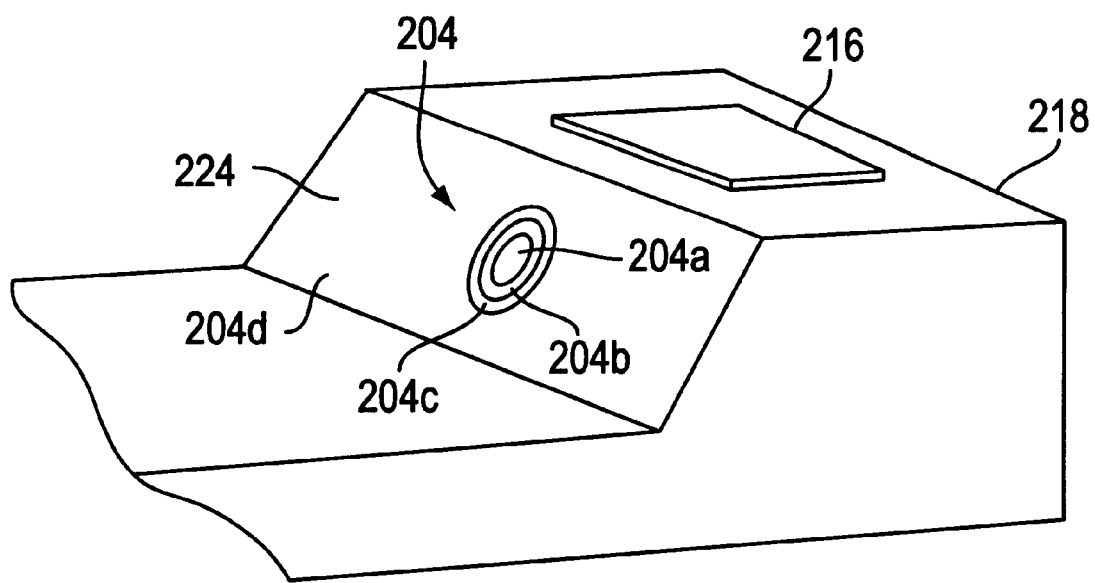
FIG. 5 is a perspective view of portions of a base stand used in the optical pickup head system in the superresolution scanning optical device in accordance with the second embodiment of the present invention.
Figure 6:
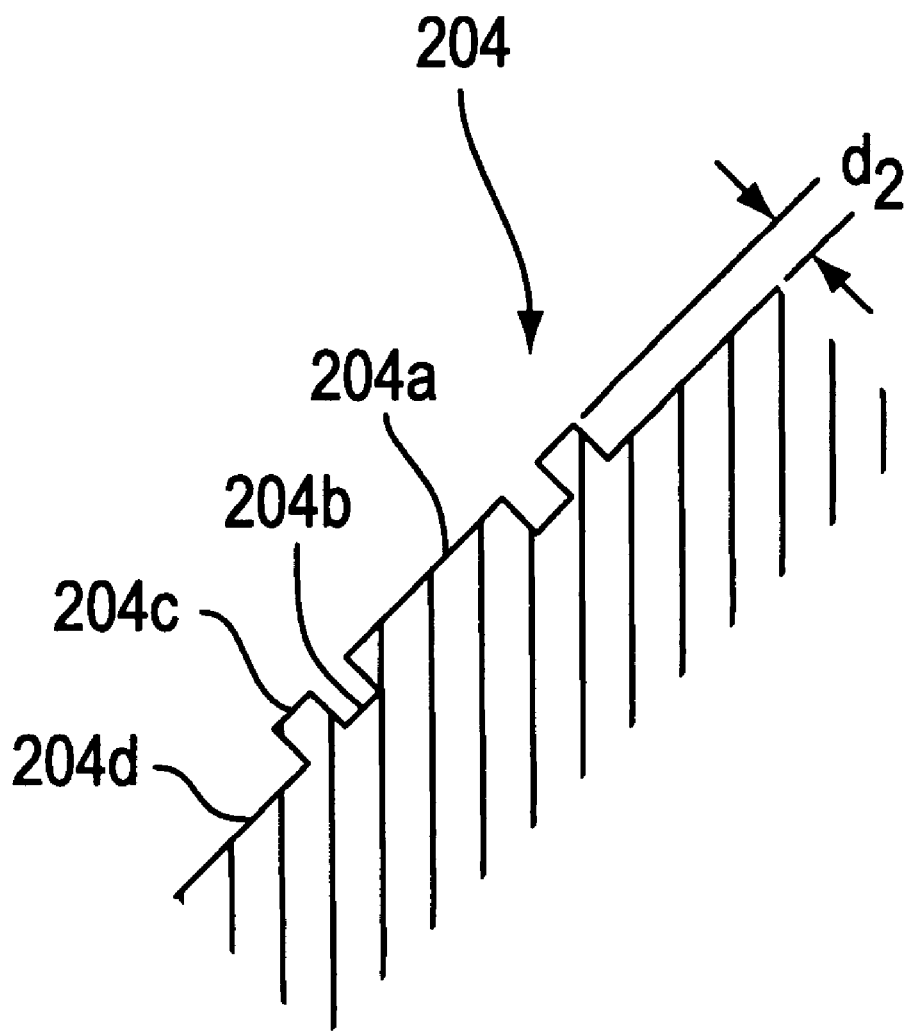
FIG. 6 is a section view of a reflexion-type phase plate used in the optical pickup head system in the superresolution scanning optical device in accordance with the second embodiment of the present invention.

FIG. 5 shows the structure of main portions of the base stand 218, and FIG. 6 shows the structure in section of the reflexion-type phase plate 204. As shown in FIG. 5, the reflexion-type phase plate 204 is formed on an inclined surface 224 of the base stand 218 which is inclined substantially at an angle of 45° with respect to the optical axis. The reflexion-type phase plate 204 is provided on the surface thereof with a center zone 204a which comprises an elliptical convex and which serves as a first phase area, an intermediate zone 204b which comprises an elliptical annular concave formed outside of the center zone 204a and which serves as a second phase area, and an outer zone 204c which comprises an elliptical annular convex formed outside of the intermediate zone 204b and which serves as a third phase area. A low reflection factor surface 204d is formed outside of the outer zone 204c on the surface of the reflexion-type phase plate 204. The center zone 204a and the outer zone 204c have the same height. Formed between the intermediate zone 204b and each of the center zone 204a and the outer zone 204c is a difference in level $d_2$ for generating a phase difference $\pi$ between transmitted lights each having a wavelength $\lambda$. This difference in level $d_2$ is given by the following equation:

$$d_2 = (\lambda/2) \times \sin(\pi/4)$$

The difference in level $d_2$ is about $0.07\lambda$.

In the reflexion-type phase plate 204, the center zone 204a, the intermediate zone 204b and the outer zone 204c form a reflection face. Out of light emitted from the coherent light source 200, a light portion which is reflected by the intermediate zone 204b and a light portion which is reflected by the center zone 204a, are reverse in phase to each other, while a light portion which is reflected by the outer zone 204c and a light portion which is reflected by the intermediate zone 204b, are reverse in phase to each other.

Figure 7:
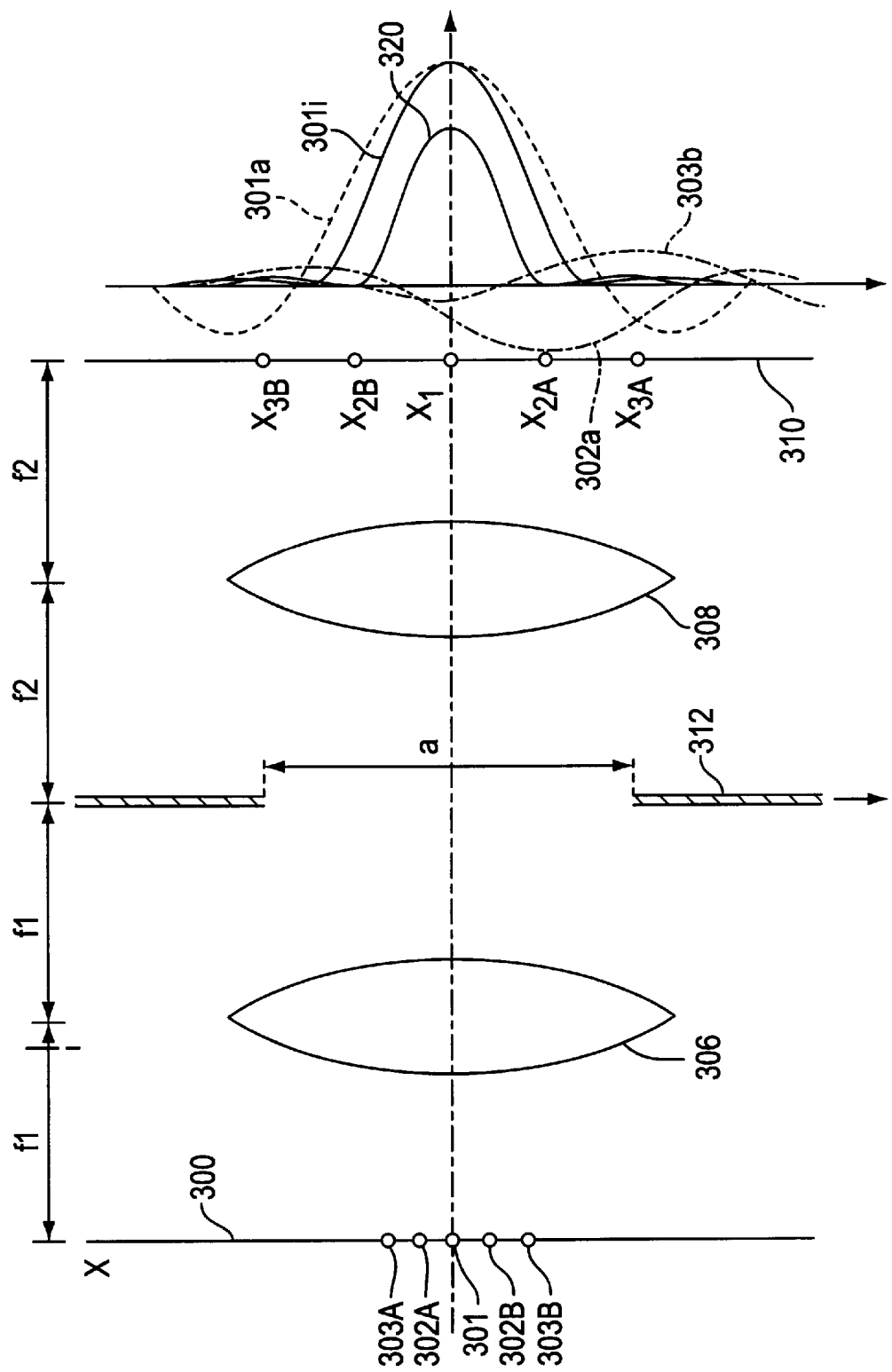
FIG. 7 is a view illustrating the operation of the optical pickup head system in the superresolution scanning optical device in accordance with each of the first and second embodiments of the present invention.

With reference to FIG. 7, the following description will discuss in detail the superresolving operation of the optical pickup head device shown in each of the first and second embodiments above-mentioned.

As shown in FIG. 7, disposed on a light source face 300 (of which X axis is shown) are a first light source 301 (phase $\Phi=0$) serving as a principal light source, a second light source 302A, 302B (phase $\Phi=\pi$) which is located in the vicinity of the first light source 301 and which serves as a first auxiliary light source in the form of a ring, and a third light source 303A, 303B (phase $\Phi=0$) which is located outside and in the vicinity of the second light source 302A, 302B and which serves as a second auxiliary light source in the form of a ring. Lights from the first, second and third light sources 301, 302A, 302B, 303A, 303B penetrate a collimate lens (a first Fourier transform lens) 306 and an objective lens (a second Fourier transform lens) 308 and reach an image forming plane 310 (of which X axis is shown), where the images thereof are respectively formed. Shown on the image forming plane 310 are the image of the first light source 301 as $X_1$, the image of the second light source 302A, 302B as $X_{2A}, X_{2B}$, and the image of the third light source 303A, 303B as $X_{3A}, X_{3B}$.

FIG. 7 shows a superresolving operation with the use of, as a model, a double diffraction optical system represented by a wave formed on an aperture 312 of an optical system. However, such an superresolving operation can be used in a variety of scanning optical systems and can be readily extended to designing of an image forming optical system.

As shown in FIG. 7, a double diffraction image of the first light source 301 alone is shown by a curve 301a (a complex amplitude distribution) and a curve 301i (an intensity distribution). However, since the second light source 302A, 302B is disposed in the vicinity of both sides of the first light source 301 with a phase π reverse to that of the first light source 301, a double diffraction image (a complex amplitude distribution) 302a of the second light source 302A is superposed on the double diffraction image 301a of the first light source 301 (a double diffraction image of the second light source 302B is not shown, but this is axially symmetric with respect to the double diffraction image 302a of the second light source 302A). Since the third light source 303A, 303B is located in the vicinity of both sides of the second light source 302A, 302B with the same phase as that of the first light source 301, a double diffraction image (a complex amplitude distribution) 303a of the third light source 303A is coherently superposed in the same manner above-mentioned (a double diffraction image of the third light source 303B is not shown, but is axially symmetric with respect to the double diffraction image 303a of the third light source 303A). The intensity distribution of a spot image obtained as a result of the interference of the first light source 301, the second light source 302A, 302B and the third light source 303A, 303B with one another, shows super-resolution as substantially shown by a curve 320.

Figure 8:
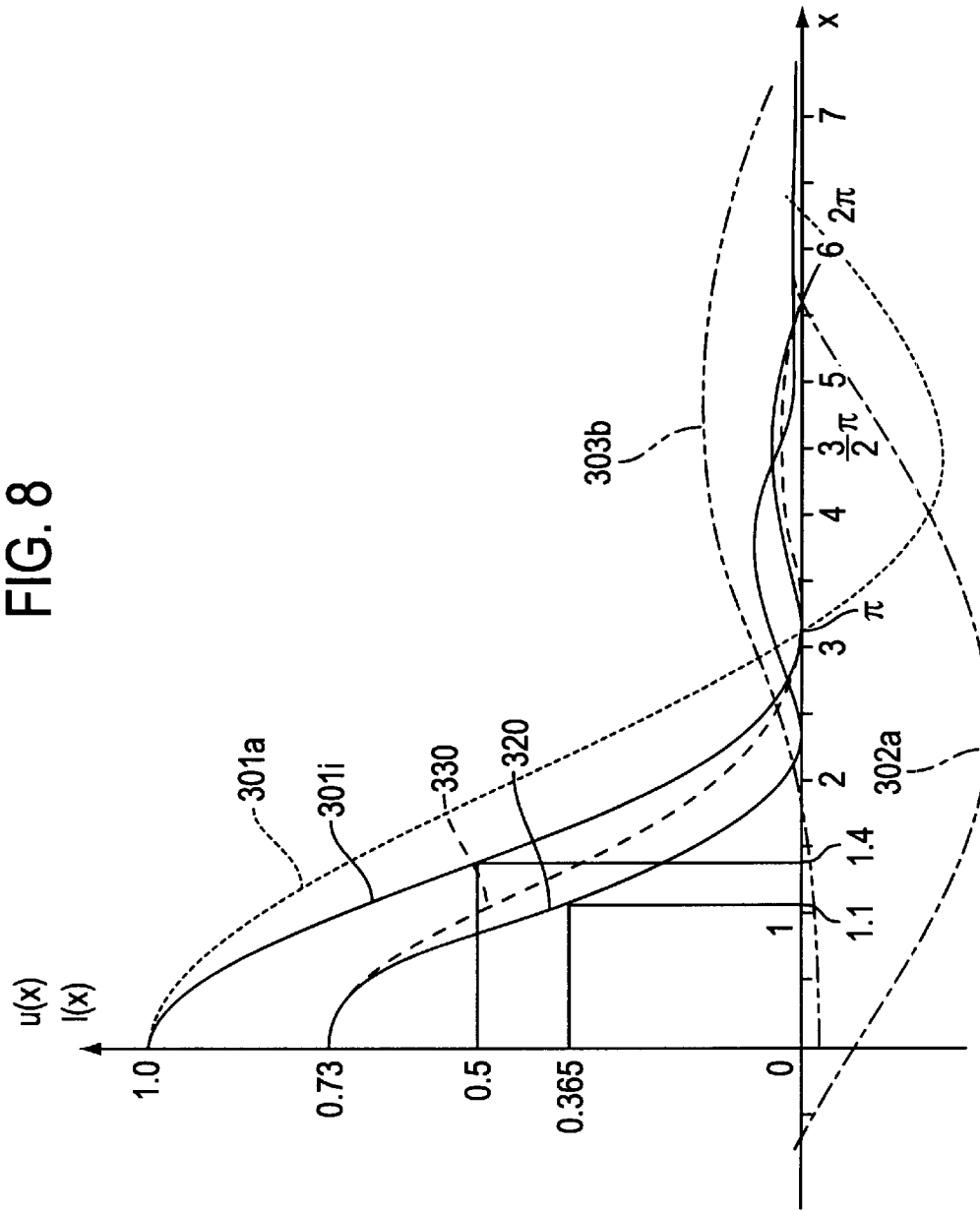
FIG. 8 is a view illustrating in detail the operation of the optical pickup head system in the superresolution scanning optical device in accordance with each of the first and second embodiments of the present invention.

Referring to FIG. 8, the following description will discuss an example of design of the phase row light sources in each of the first and second embodiments of the present invention, while giving comprehensible numerals by way of example.

First, the following is now set forth as a premise.

The complex amplitude of the double diffraction image of the first light source 301 is represented by $$u_1(x) = \sin x / x \tag{1}$$

The complex amplitudes of the double diffraction images of the second light source 302A, 302B are represented by $$u_{2A}(x) = A_{+1} \times (\sin (x-\delta_1)/(x-\delta_1)) \tag{2}$$

$$u_{2B}(x) = A_{-1} \times (\sin (x+\delta_1)/(x+\delta_1)) \tag{3}$$

The complex amplitudes of the double diffraction images of the third light source 303A, 303B are represented by $$u_{3A}(x) = A_{+2} \times (\sin (x-\delta_2)/(x-\delta_2)) \tag{4}$$

$$u_{3B}(x) = A_{-2} \times (\sin (x+\delta_2)/(x+\delta_2)) \tag{5}$$

In the equations above-mentioned, $A_{+1}$, $A_{-1}$ and $A_{+2}$, $A_{-2}$ respectively refer to the relative amplitudes of the second light source 302A, 302B and the third light source 303A, 303B when the amplitude of the first light source 301 is normalized to 1. Here, x is equal to $(a/(\lambda \times f)) \times \xi$, a is the opening diameter of the aperture face 312, $\delta_1$ is the coordinates of the peak position in the complex amplitude distribution of the second light source 302A, 302B, $\delta_2$ is the coordinates of the peak position in the complex amplitude distribution of the third light source 303A, 303B, is the wavelength of each light source, f is equal to $f_2$ ($f_2$ is the focal length of an objective lens 308. See FIG. 7), and $\xi$ is the coordinates of the image forming face 310 in terms of real dimensions. In FIG. 7, $f_1$ is the focal length of a focusing lens 306.

The complex amplitude distribution of a double diffraction image obtained as a result of the coherent superposition of the equations (1) to (5) is represented by the following equation:

$$u(x) = \tag{6}$$

$$\sin x / x + A_{+1} \times (\sin(x-\delta_1)/(x-\delta_1)) + A_{-1} \times (\sin(x+\delta_1)/(x+\delta_1)) +$$

$$A_{+2} \times (\sin(x-\delta_2)/(x-\delta_2)) + A_{-2} \times (\sin(x+\delta_2)/(x+\delta_2))$$

In FIG. 8, plotted in the form of a curve 320 is the intensity distribution of the double diffraction image, i.e., $I_1(x) = |u(x)|^2$, which is calculated, by way of design example, according to the equation (6) in which $A_{+1} = A_{-1} = -0.3$, $A_{+2} = A_{-2} = 0.15$, 3, $\delta_1 = 2.5$rad and $\delta_2 = 5$rad. For comparison, FIG. 8 also shows, in the form of a curve 330, $I_{00}(x) = 0.73 \times I_0$ which represents a distribution where the peak value $I_0$ on the optical axis of the intensity distribution of the double diffraction image formed with the first light source 301 alone, is arranged as multiplied by 0.73.

From the results of these calculations, it is understood that the intensity distribution 320 of the double diffraction image is reduced to about 1.1/1.4 (approximately 0.79) in half-width as compared with the distribution 330 above-mentioned (where the distribution obtained with the first light source 301 alone is multiplied by 0.73).

Figure 19:
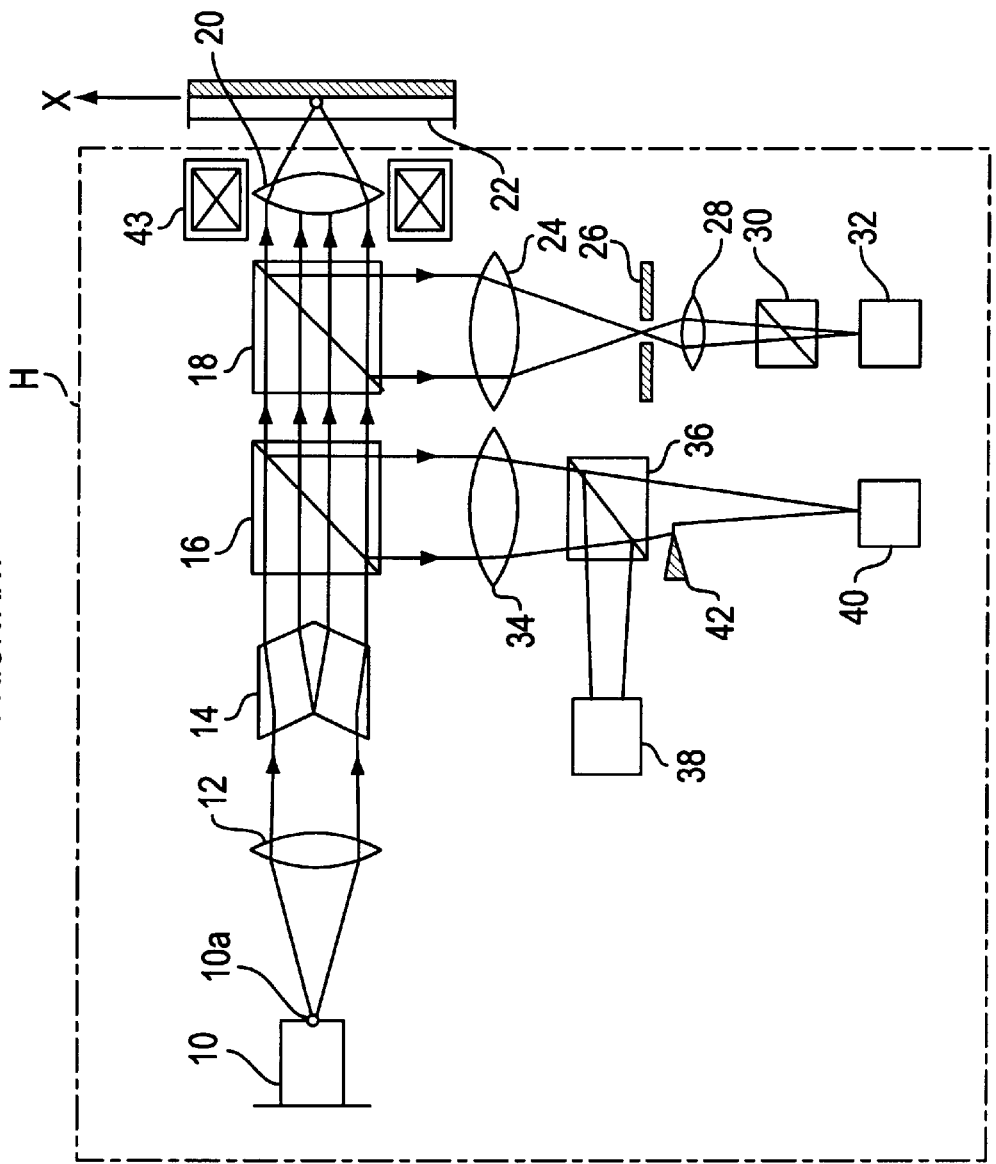
FIG. 19 is a schematic view illustrating the arrangement of an optical pickup head system in a conventional superresolution scanning optical device.
Figure 20:
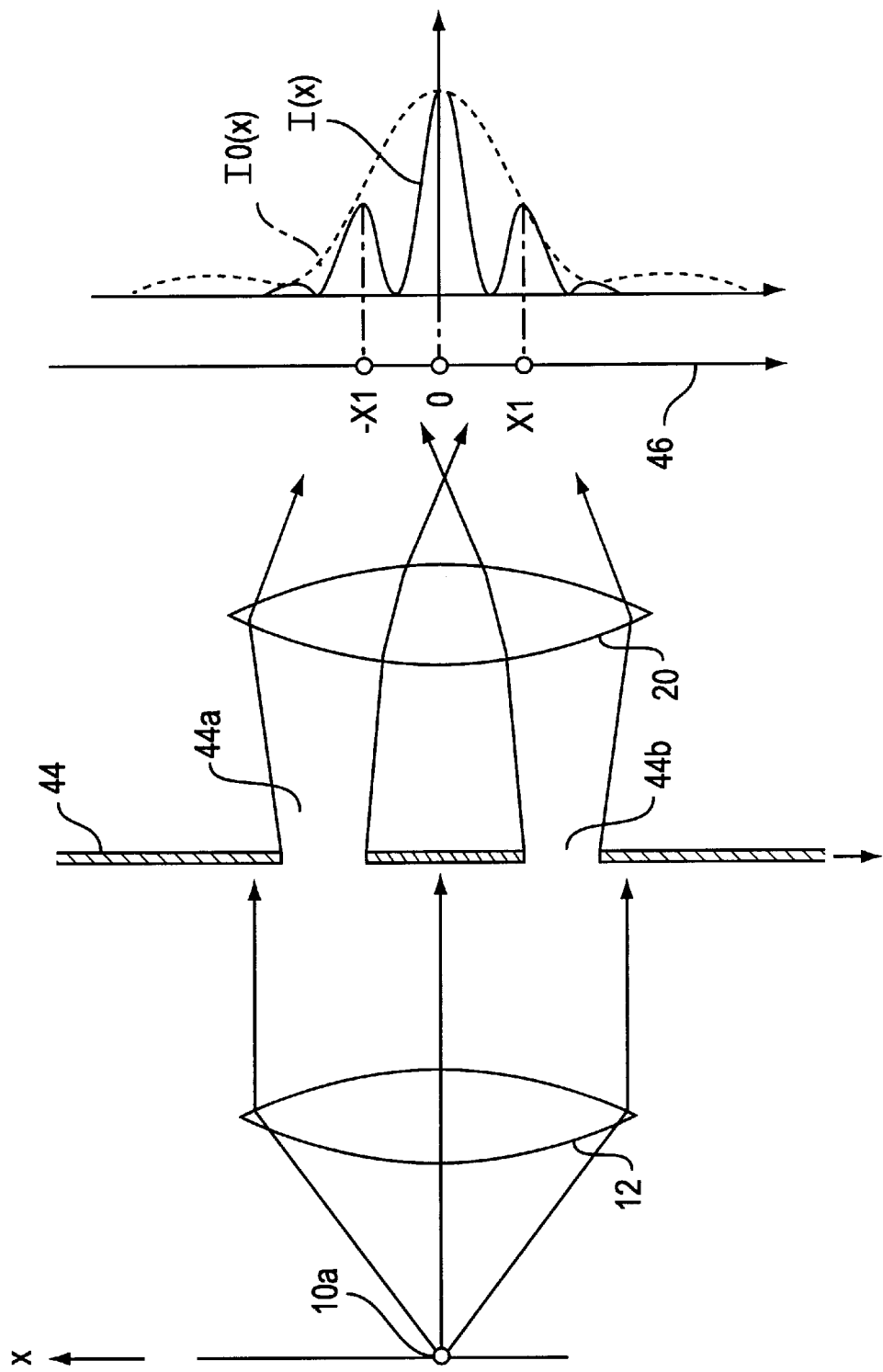
FIG. 20 is a view illustrating the principle of superresolution by the optical pickup head system in the conventional superresolution scanning optical device.

Further, the rate of the amount of light distributed outside of the half-width is reduced as compared with the distribution 330 where the distribution obtained with the first light source 301 alone is multiplied by 0.73. Accordingly, there is eliminated a slit optical system (designated by 26 in FIG. 19) for restraining the side lobes which is used in a conventional superresolution optical system having a simple annular opening.

In a normal image forming optical system, there is generally used a circular aperture rather than a rectangular aperture In this case, the shape of a spot obtained on the image forming plane is expressed by the following equation using the first-kind Bessel's Function $J_1$ (r):

$$u(r) = 2 \times J_1(r) \times (1/r) \tag{7}$$

wherein r is given by a $\times (1/\lambda f) \times \xi$.

As compared with an arrangement having a rectangular aperture, the main lobe size (the image obtained with a circular aperture is called an Airy pattern, of which diameter D is equal to $1.22 \times a \times (1/\lambda f) \times \xi$) is greater by 1.22 time (when r is approximately 3.8, $J_1$ (r) is equal to 0).

Accordingly, the optimum layout of light source rows for producing a superresolution effect with a circular opening is slightly different from that with a rectangular aperture. As one example of design, when the center of the main lobe of the second light source is located in the vicinity of $r = \pm 3$, the center of the main lobe of the third light source is located in the vicinity of $r = \pm 4.5$, the amplitude ratio of the second light source to the first light source is set to 0.3 and the amplitude ratio of the third light source to the first light source is set to about 0.15, there is produced a superresolution effect of about 0.9 time when compared in terms of half-width.

FIG. 9 shows an example of the layout of light source rows. In this example, to maximize the superresolution effect on the image forming face and to maximize the peak value of the main lobe of the first light source 301, each of the second light source 302 and the third light source 303 is so arranged as to appear in a discontinuous manner (in the form of islets).

Figure 10:
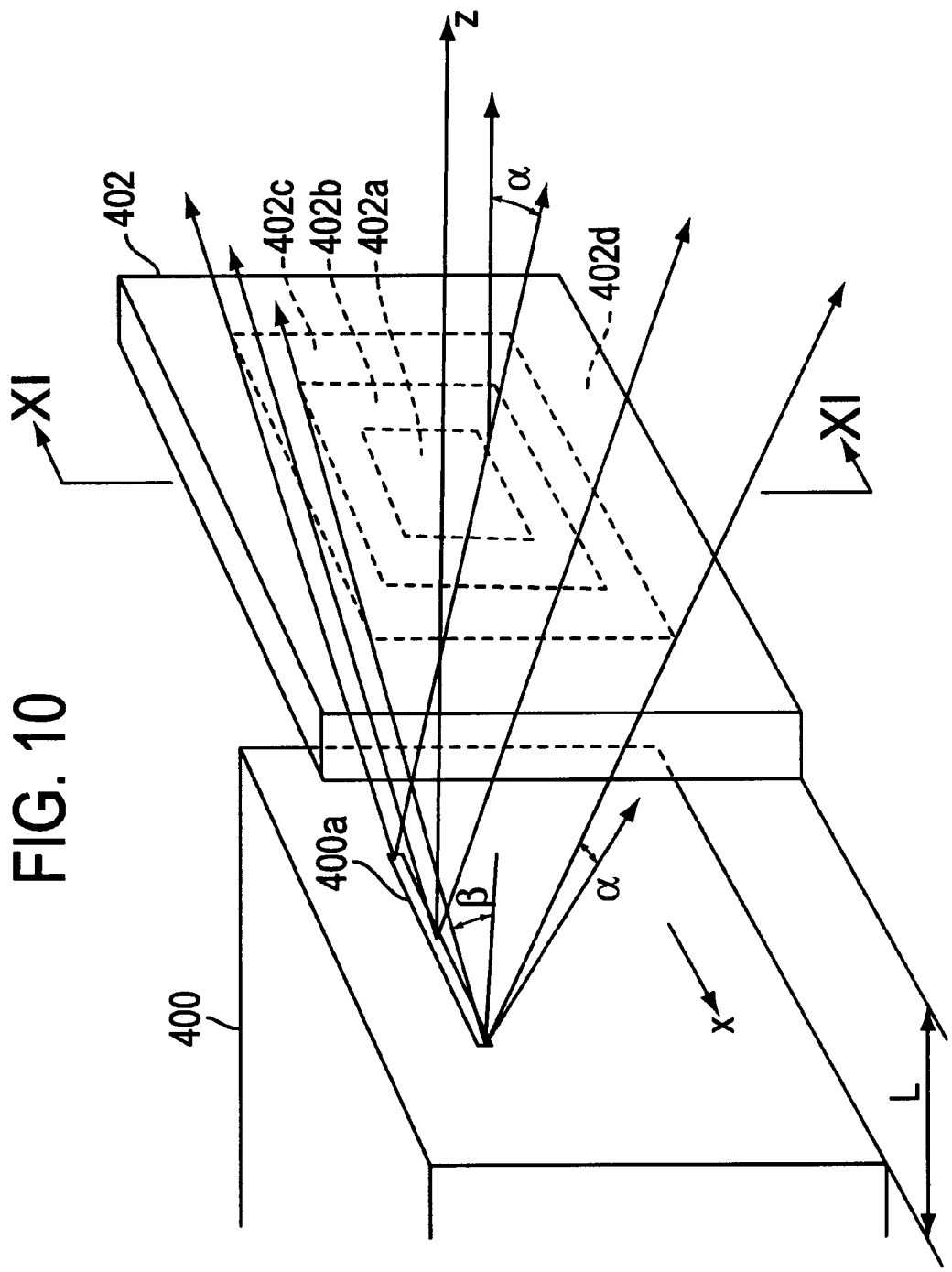
FIG. 10 is a perspective view of a first embodiment of a superresolution light source device used in the superresolution scanning optical device in accordance with each of the first and second embodiments of the present invention.
Figure 11:
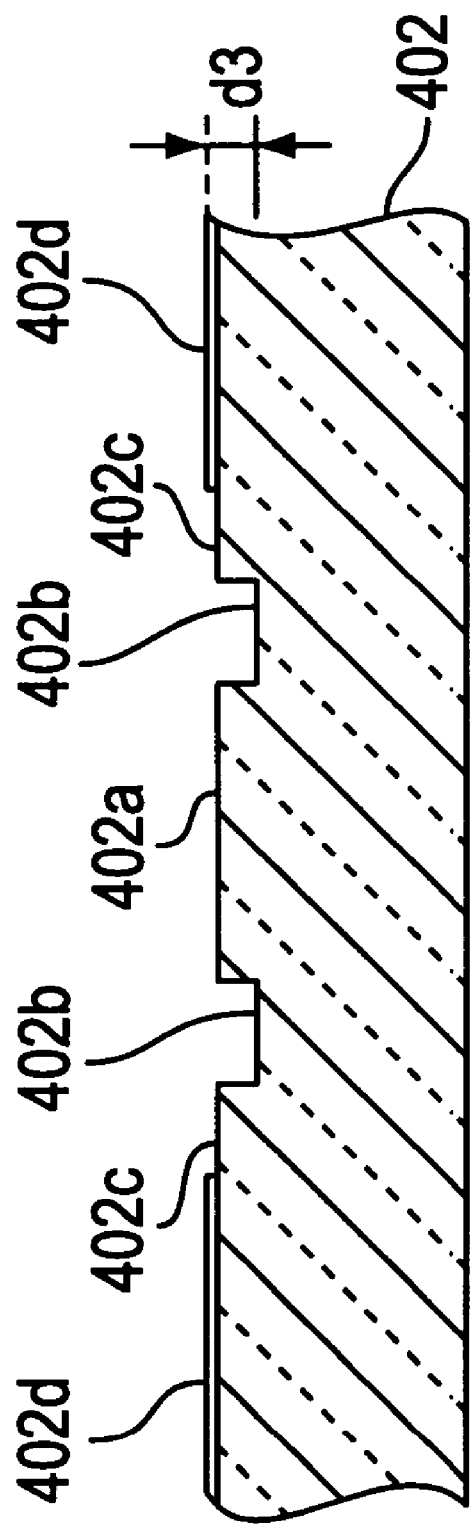
FIG. 11 is a section view taken along the line XI—XI in FIG. 10.

FIG. 10 shows the arrangement of a first embodiment of a superresolution light source device which can be commonly used in the optical pickup head devices in accordance with the first and second embodiments of the present invention. FIG. 11 shows the structure of the superresolution light source device in section taken along the line XI—XI in FIG. 10.

A phase plate 402 is disposed in the vicinity of an opening 400a in the light emission surface of a coherent light source 400 comprising a semiconductor laser. As shown in FIG. 11, the phase plate 402 includes a difference in level. More specifically, the phase plate 402 is provided on the surface thereof with a first phase area 402a comprising a rectangular convex, a second phase area 402b comprising a convex in the form of a rectangular frame formed outside of the first phase area 402a, and a third phase area 402c comprising a convex in the form of a rectangular frame formed outside of the second phase area 402b. An opaque area 402d is formed outside of the third phase area 402c on the surface of the phase plate 402. As the opaque area 402d, an opaque film may be used for intercepting light, but the opaque area 402d may be disregarded since the amount of incident light is substantially small. The first phase area 402a and the third phase area 402c have the same level, and between each of the first and third phase areas 402a, 402c, and the second phase area 402b, there is formed a difference in level $d_3$ for generating a difference in phase π between transmitted lights each having a wavelength λ. The difference in level $d_3$ is given by the following equation:

$$d_3=\lambda/(2\times(n-1))$$

Accordingly, light which penetrates the first phase area 402a serves as the first light source 301 in FIG. 7, light which transmits the second phase area 402b serves as the second light source 302A, 302B in FIG. 7, and light which transmits the third phase area 402c serves as the third light source 303A, 303B in FIG. 7.

When the phase plate 402 having the arrangement above-mentioned is used and the distance L between the phase plate 402 and the coherent light source 400 is set to a suitable small value, the diameter of a spot obtained by a scanning optical system using the superresolution light source device of the present invention can be reduced according to the principle discussed with reference to FIG. 7. Further, it becomes possible to improve the uneven spread of the diffraction angle, i.e., the phenomenon where B is greater than α in FIG. 10, that has been regarded as a defect in a conventional semiconductor laser, so that a great spread angle α' can be obtained even in the x-axis direction. Further, it becomes possible to correct astigmatism of a semiconductor laser.

Figure 12:
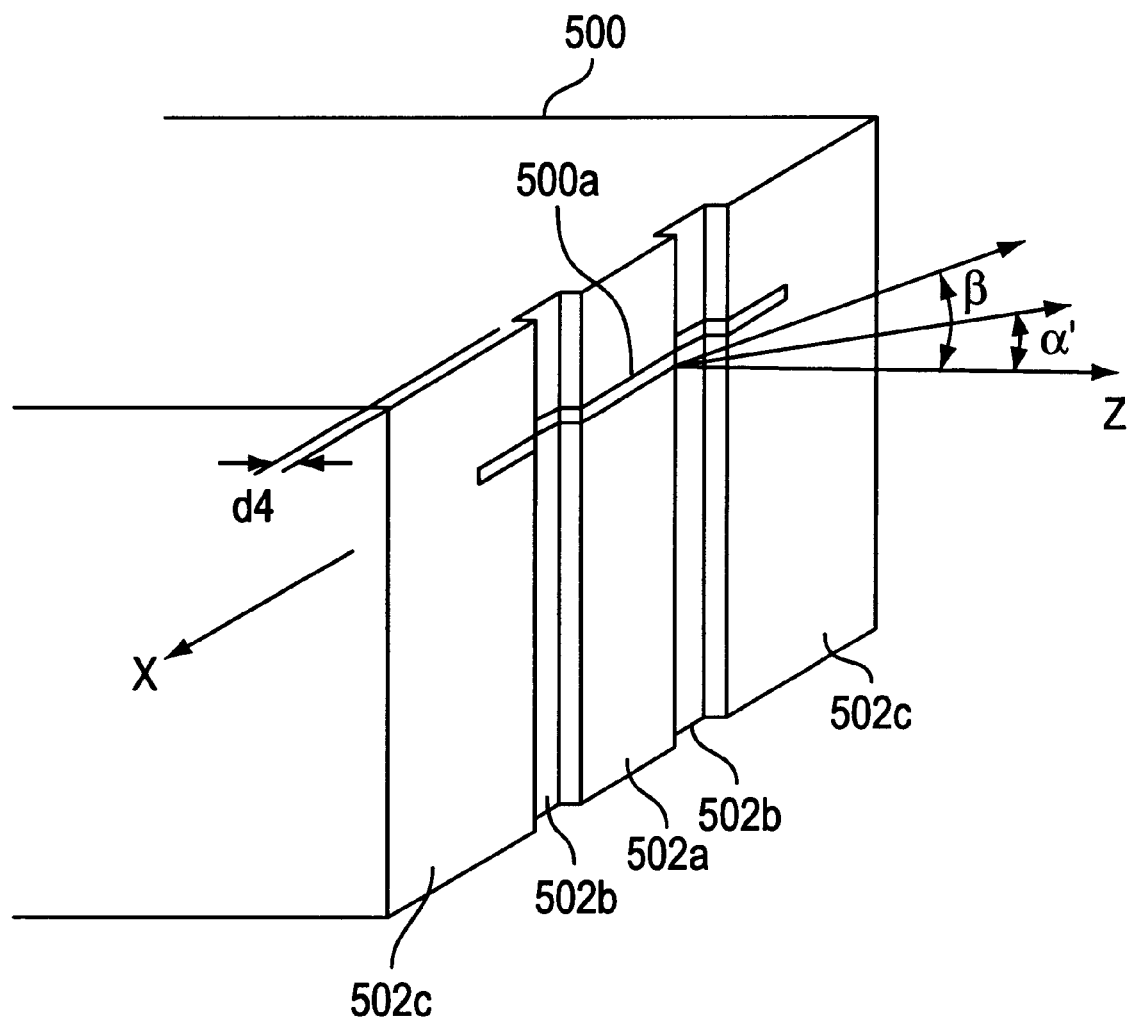
FIG. 12 is a perspective view of a second embodiment of the superresolution light source device used in the superresolution scanning optical device in accordance with each of the first and second embodiments of the present invention.

FIG. 12 shows the arrangement of a second embodiment of the superresolution light source device which can be commonly used in the optical pickup head devices mentioned earlier.

As shown in FIG. 12, in the superresolution light source device according to the second embodiment, a phase film made of, for example, $SiO_2$ is formed on the light emission facet of a semiconductor laser 500 to form a one-dimensional grid-like phase area, thus forming a superresolution light source. More specifically, the semiconductor laser 500 is provided on the light emission facet thereof with a first phase area 502a in the form of a convex extending at right angles to a light emission opening 500a of the semiconductor laser 500, second phase areas 502b, each in the form of a concave, extending at both sides of and in parallel to the first phase area 502a, and third phase areas 502c, each in the form of a convex, formed outside of and in parallel with the second phase areas 502b. The first phase area 502a and the third phase areas 502c have the same level, and between each of the first and third phase areas 502a, 502c and the second phase areas 502b, there is formed a difference in level $d_4$ for generating a difference in phase π between transmitted lights each having a wavelength λ. The difference in level $d_4$ is given by the following equation:

$$d_4=\lambda/(2\times(n_a-1))$$

wherein $n_a$ is the refractive index of the phase film.

Figure 13:
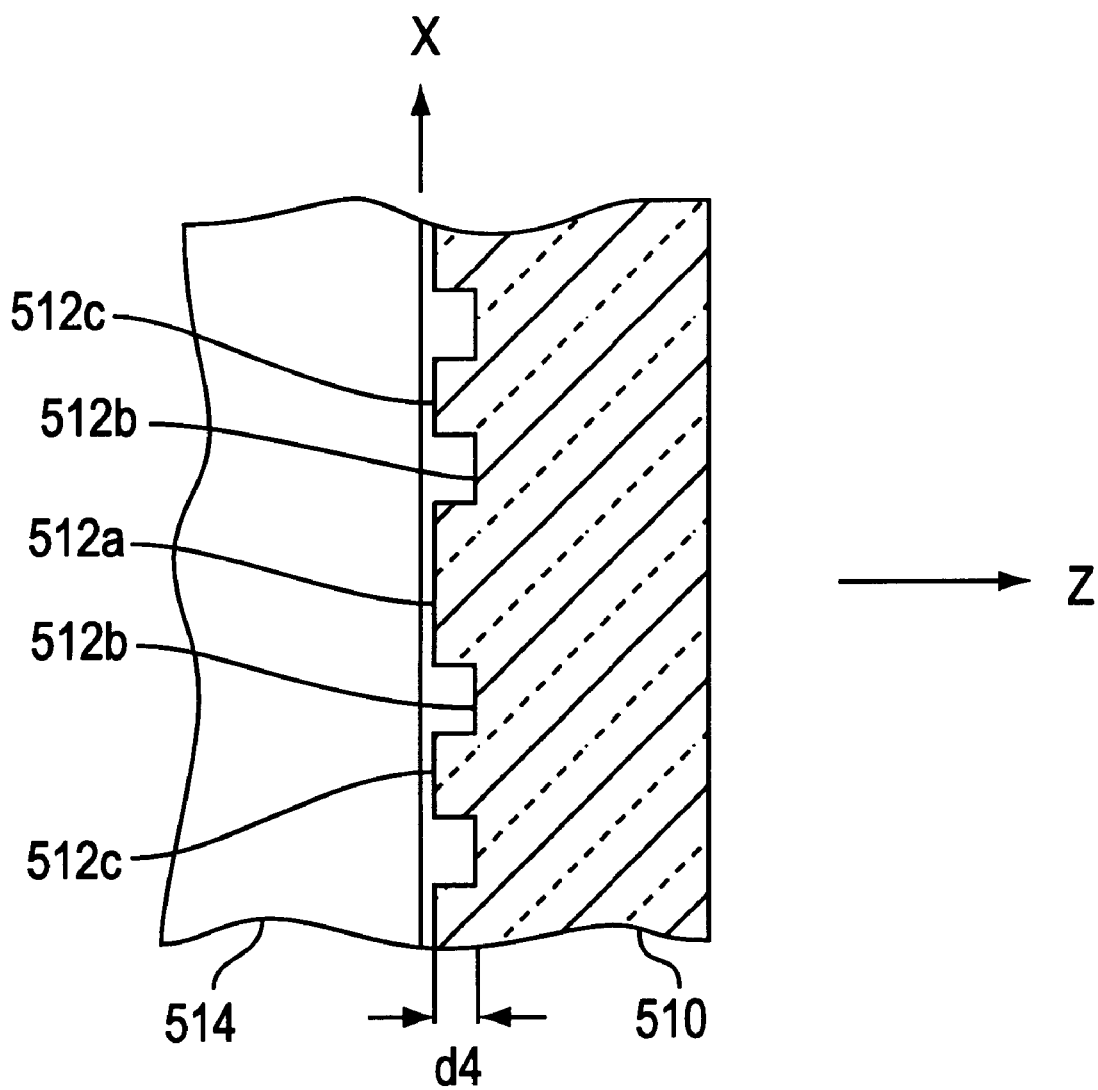
FIG. 13 is a section view of a modification of the second embodiment of the superresolution light source device used in the superresolution scanning optical device in accordance with each of the first and second embodiments of the present invention.

FIG. 13 shows a modification of the superresolution light source according to the second embodiment shown in FIG. 12. In this modification, a substrate 510 made of, for example, $SiO_2$ is provided on the surface thereof with first, second and third phase areas 512a, 512b, 512c which produce operational effects similar to those produced by the first, second and third phase areas 502a, 502b, 502c above-mentioned. The substrate 510 is disposed opposite to the light emission face of a semiconductor laser 514.

In the optical pickup head devices and the superresolution light source devices according to the first and second embodiments above-mentioned, the description has been made of the arrangement where two light sources comprising the second and third light sources are used as auxiliary light sources, but the number of the auxiliary light sources is not limited to two. Rows of faint auxiliary light sources comprising fourth and fifth light sources may be combined to enhance the superresolution effect and the side-lobe restraining effect.

Figure 14:
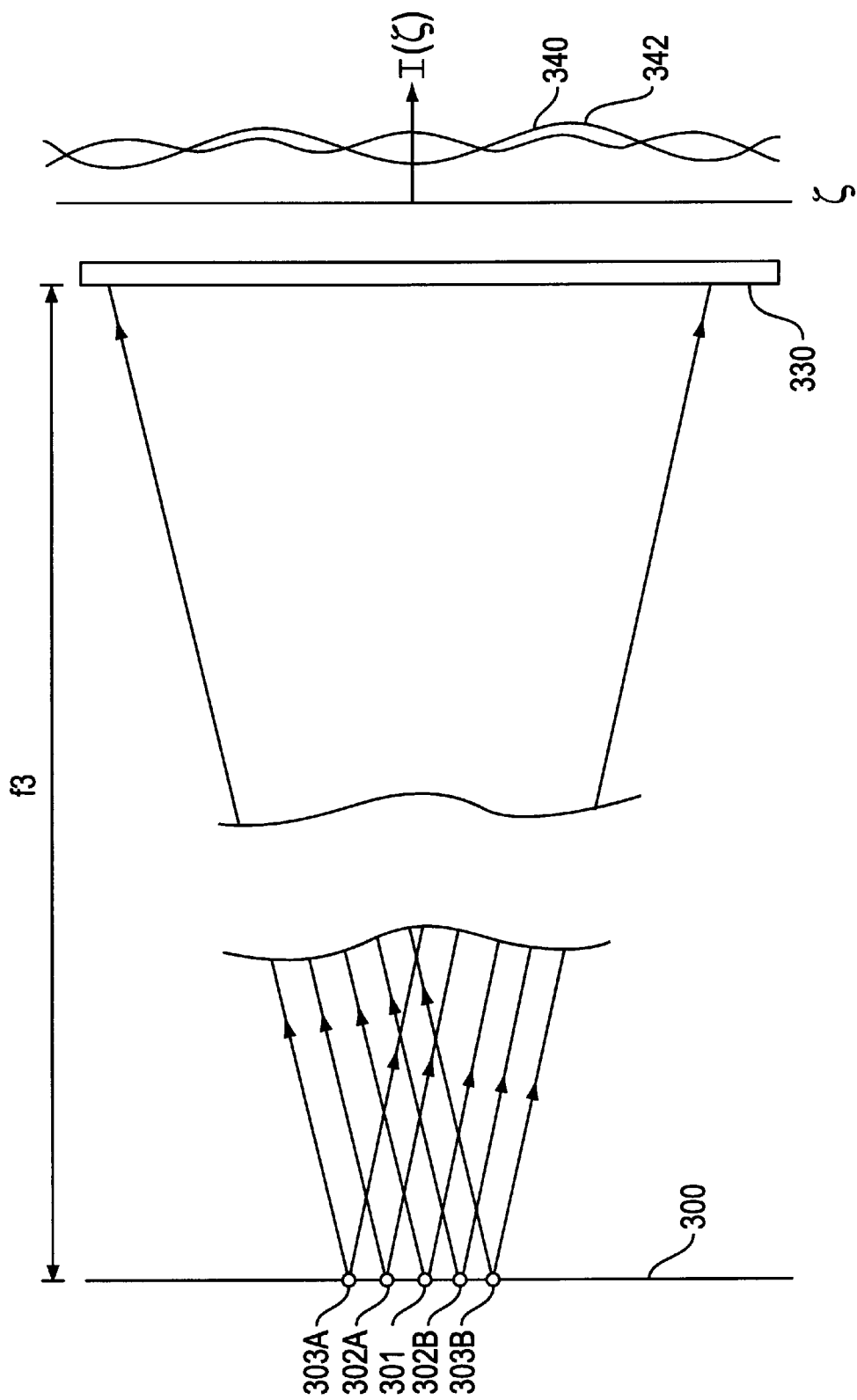
FIG. 14 is a view illustrating the operational principle of a holographic filter for superresolution used in the superresolution scanning optical device in accordance with each of the first and second embodiments of the present invention.

FIG. 14 shows the principle of a holographic filter for superresolution which provides an equivalent of the superresolution light source device above-mentioned and which can be commonly used in the light pickup head devices according to the first and second embodiments of the present invention.

With the principal light source of the first light source 301 shown in FIG. 7 regarded as a reference light source and with the auxiliary light source rows of the second and third light sources 302A, 302B 303A, 303B in FIG. 7 regarded as object lights, an interference pattern is recorded on a photosensitive plane 330. Here, distances between the respective points are extremely small of $10^{-3}$ order (one thousandth) as compared with the distance $f_3$ between the light source face 300 and the photosensitive face 330. Accordingly, there is obtained, on the photosensitive plane 330, an interference pattern of a kind of a lensless Fourier transform hologram. For example, an interference component of the points 301 and 302A with each other and an interference component of the points 301 and 302B with each other, appear in the form of a curve 340 as the intensity distribution I (ξ), and an interference component of the points 301 and 303A with each other and an interference component of the points 301 and 303B with each other, appear in the form of a curve 342. This is considerably different from a conventional holography in that an interference pattern in mere several cycles is formed in a predetermined opening.

Figure 15:
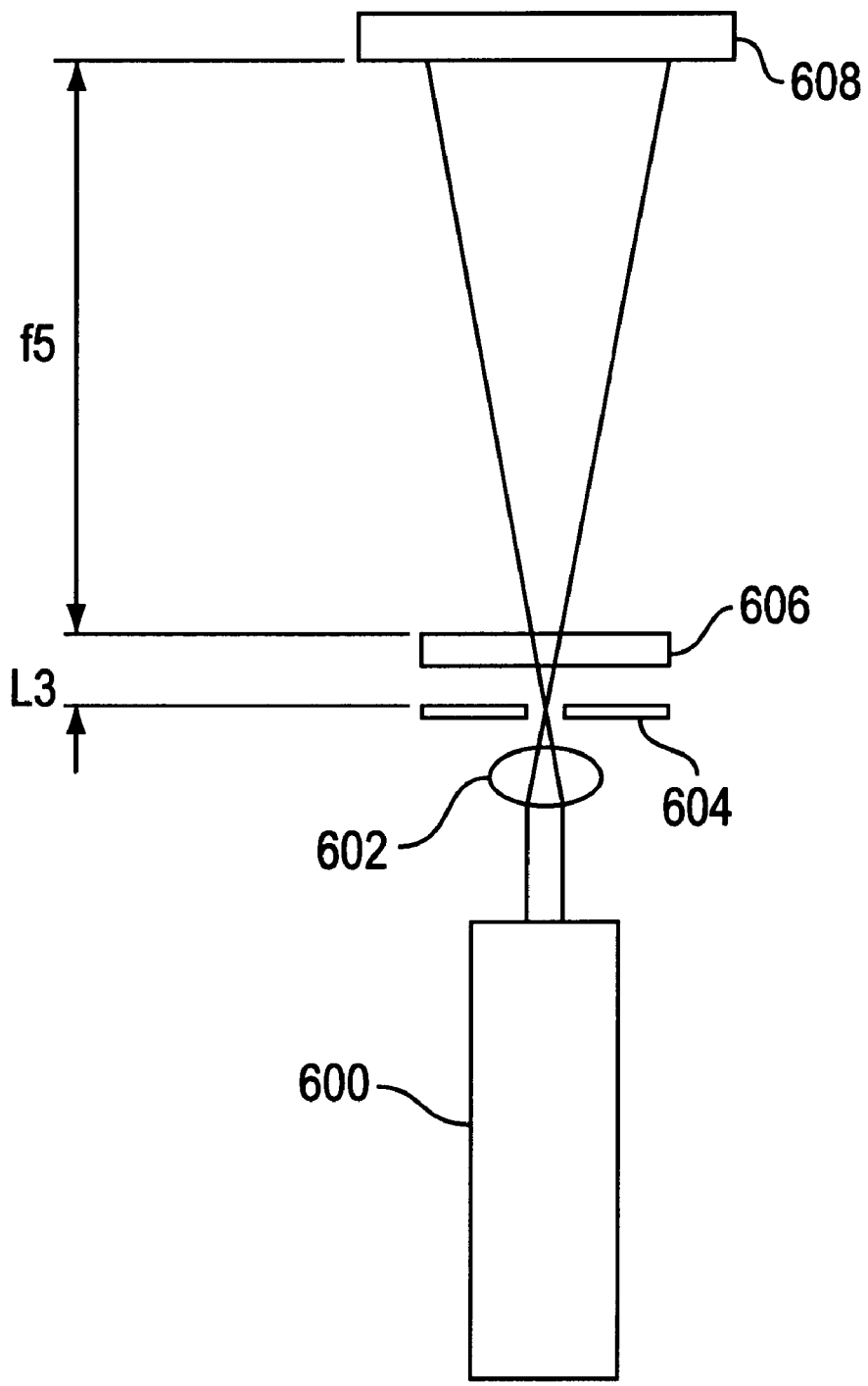
FIG. 15 is a view illustrating how to prepare a holographic filter used in the superresolution scanning optical device in accordance with each of the first and second embodiments of the present invention.

FIGS. 15 to 17 show a method of actually producing a superresolution holographic filter according to the holography above-mentioned.

As shown in FIG. 15, a coherent beam emitted from a semiconductor laser light source 600 is focused on a pinhole 604 through a focusing lens 602 for spatial filtering, and is then incident upon a phase plate 606 having a predetermined phase structure, so that a hologram is formed on a hologram plane of a photosensitive medium 608 disposed at a position remote by a distance $f_5$ from the phase plate 606.

Figure 16A:
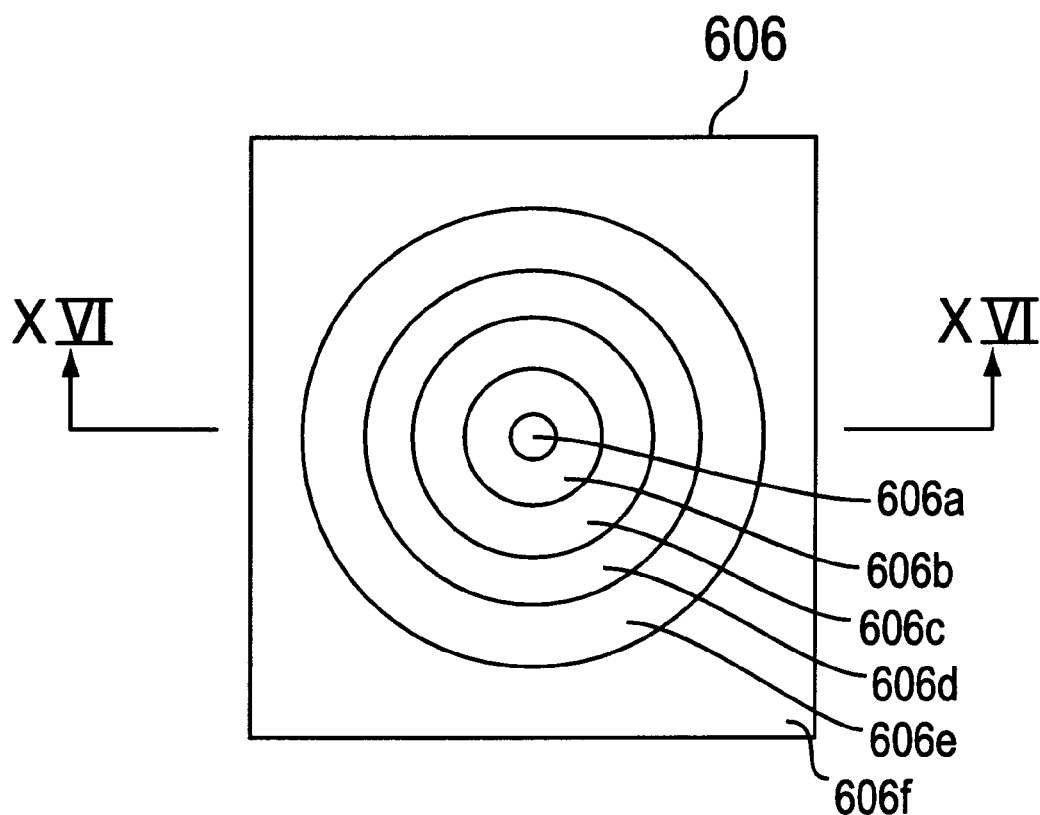
FIG. 16 shows an annular phase structure formed in the phase plate forming a holographic filter for superresolution used in the superresolution scanning optical device in accordance with each of the first and second embodiments of the present invention, in which (a) is a front view thereof and (b) is a section view taken along the line XVI—XVI in FIG. 16(a)
Figure 16B:
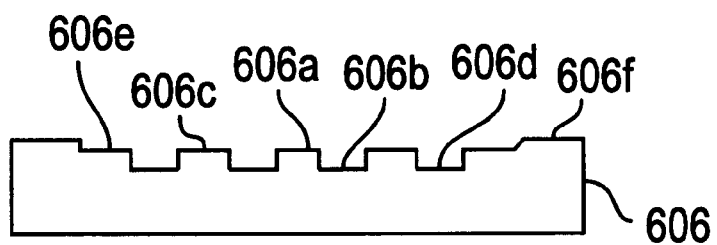

FIG. 16(a) and (b) show an annular phase structure formed on the surface of the phase plate 606 serving as a superresolution filter. FIG. 16(b) is a section view taken along the line XVI—XVI in FIG. 16 (a). The phase plate 606 is provided on the surface thereof with a center area 606a (phase Φ=0) in the form of a circular convex formed at the center of the surface, a first phase area 606b (phase Φ=π) in the form of an annular concave formed outside of the center area 606a, a second phase area 606c (phase Φ=0) in the form of an annular convex formed outside of the first phase area 606b, a third phase area 606d (phase Φ=π) in the form of an annular concave formed outside of the second phase area 606c, a fourth phase area 606e (phase Φ=0) in the form of an annular convex formed outside of the third phase area 606d, and an opaque area 606f in the form of a convex outside of the fourth phase area 606e. According to the operational principle discussed with reference to FIG. 12, a beam which penetrates the center area 606a of the phase plate 606, serves as the reference light mentioned earlier.

Figure 17A:
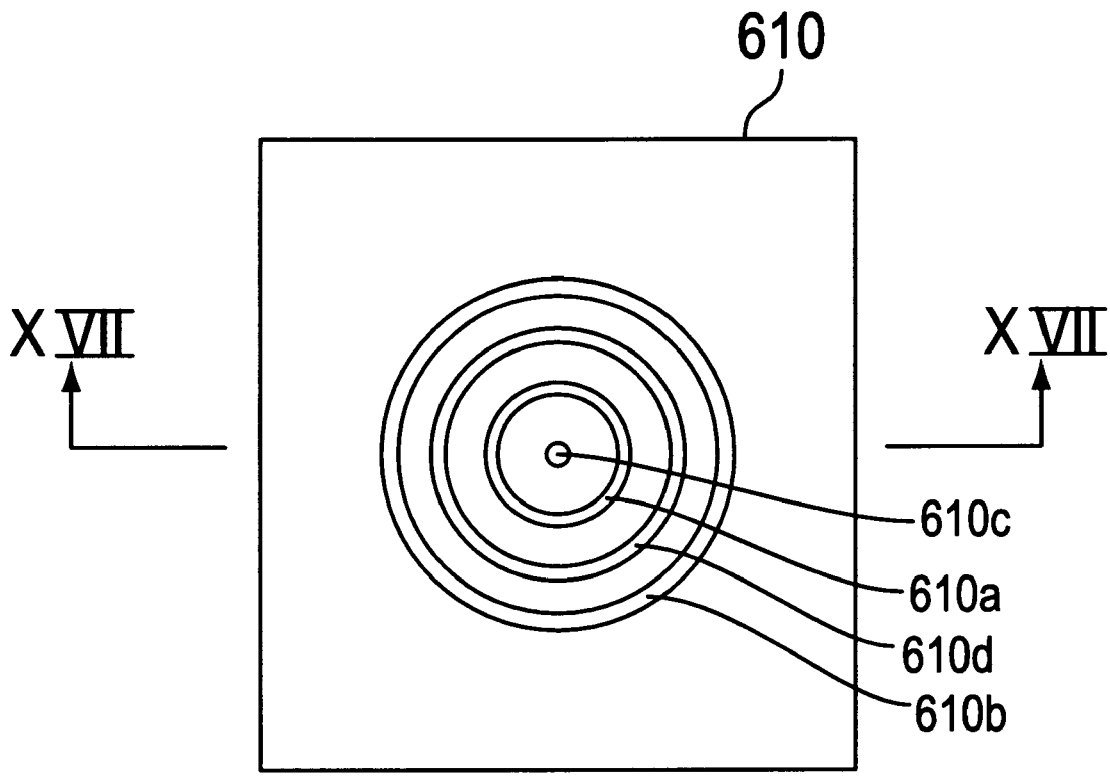
FIG. 17 shows a modification of the annular phase structure formed in the phase plate forming a holographic filter for superresolution used in the superresolution scanning optical device in accordance with each of the first and second embodiments of the present invention, in which (a) is a front view thereof and (b) is a section view taken along the line XVII—XVII in FIG. 17(a)
Figure 17B:
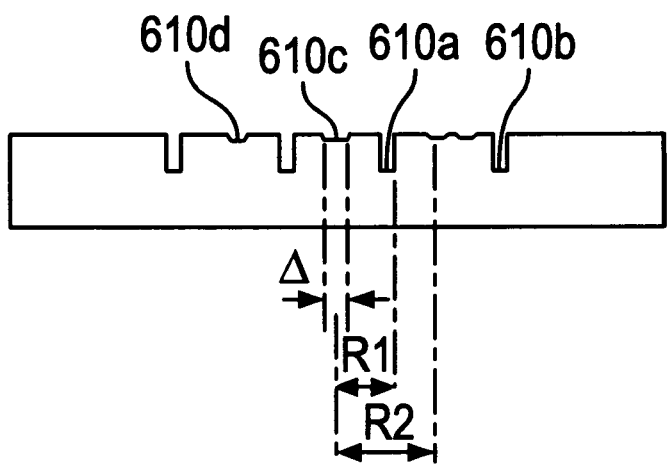

FIG. 17(a) and (b) show an annular phase structure formed on the surface of a phase plate 610 serving as a superresolution filter as a modification of the phase plate 606. FIG. 17(b) is a section view taken along the line XVII—XVII in FIG. 17(a). The phase plate 610 is provided on the surface thereof with an inner annular concave groove 610a (the radius of the outer periphery: $R_1$) and an outer annular concave groove 610b. In the circular area inside of the inner concave groove 610a, an opaque area is formed except for a center area 610c (diameter: Δ) comprising a circular transparent part. Formed between the inner and outer concave grooves 610a, 610b is an annular area 610d comprising an annular transparent part. According to the operational principle discussed with reference to FIG. 14, a beam which transmits the center area 610c (phase Φ=0) of the phase plate 610, serves as the reference light mentioned earlier. The inner concave groove 610a forms the first phase area (phase Φ=π), the annular area 610d (the radius of the inner periphery: $R_2$ forms a second phase area (phase Φ=0), and the outer concave groove 610b forms a third phase area (phase Φ=π).

As means for approximating the amounts of lights in the respective areas to the designed values, there is conveniently adopted a method of adjusting the distance $L_3$ between the condenser lens 602 and the surface of the phase plate 606 (610) in FIG. 15 with respect to a laser beam of Gaussian distribution. To achieve the object more precisely, there may be adopted a method in which there are disposed absorbing films having predetermined transmittance at the annular areas of the phase plate 606 (610).

In actually designing the embodiments of the present invention discussed in the foregoing, it is preferable that $δ_2$ is set to $2δ_1$ in Equation (6) and $R_2$ is set to $2R_1$ in FIG. 17 in an example of preparation of a holographic filter. Thus, even though, as a result of preparation of a hologram, secondary harmonics are generated from an interference component of the first auxiliary light source, i.e., the light transmitting the first phase area 606b of the phase plate 606 or the inner concave groove 610a in the phase plate 610, with the principal light source (reference light), i.e., the light transmitting the center area 606a of the phase plate 606 or the center area 610c of the phase plate 610, such secondary harmonics are identical with an interference component of the second auxiliary light source with the principal light source. Accordingly, such secondary harmonics exert no bad influence upon the transmittance characteristics of the superresolution filter, i.e., the regenerated image characteristics of the holographic filter.

According to any of the embodiments of the present invention, a distortion term generated in a normal hologram can be restrained to such an extent as to exert no substantial bad influence upon the characteristics required as a superresolution filter, when the ratio of the amount of light of the reference light source is sufficiently increased.

The following will discuss the effects produced by the use of such a superresolution holographic filter.

(1) This eliminates the need to dispose a fine phase plate on the light source surface of an individual scanning optical device. That is, the original of a precise holographic filter can be produced with a holographic interferometric optical system installed in a separate factory, and a replica of the original can be installed in any of a variety of normal scanning optical systems (generally, it is preferable to insert such a replica in the vicinity of a collimate lens).

(2) With an optical system for illuminating a superresolution holographic filter once prepared, the major amount of light incident upon the holographic filter contributes to the formation of a principal beam image on the image forming plane, thereby to obtain a bright superresolution spot with the side lobes restrained.

The effect (2) would be understood from the fact that the amount of light is not considerably lost except that a zeroth transmitted light through a holographic filter is emitted in an equivalent value from the principal light source of the superresolution light source, causing the light to become a beam, and this beam interferes with beams from the regenerated first and second auxiliary light sources, thereby to form a predetermined superresolution spot.

Figure 18:
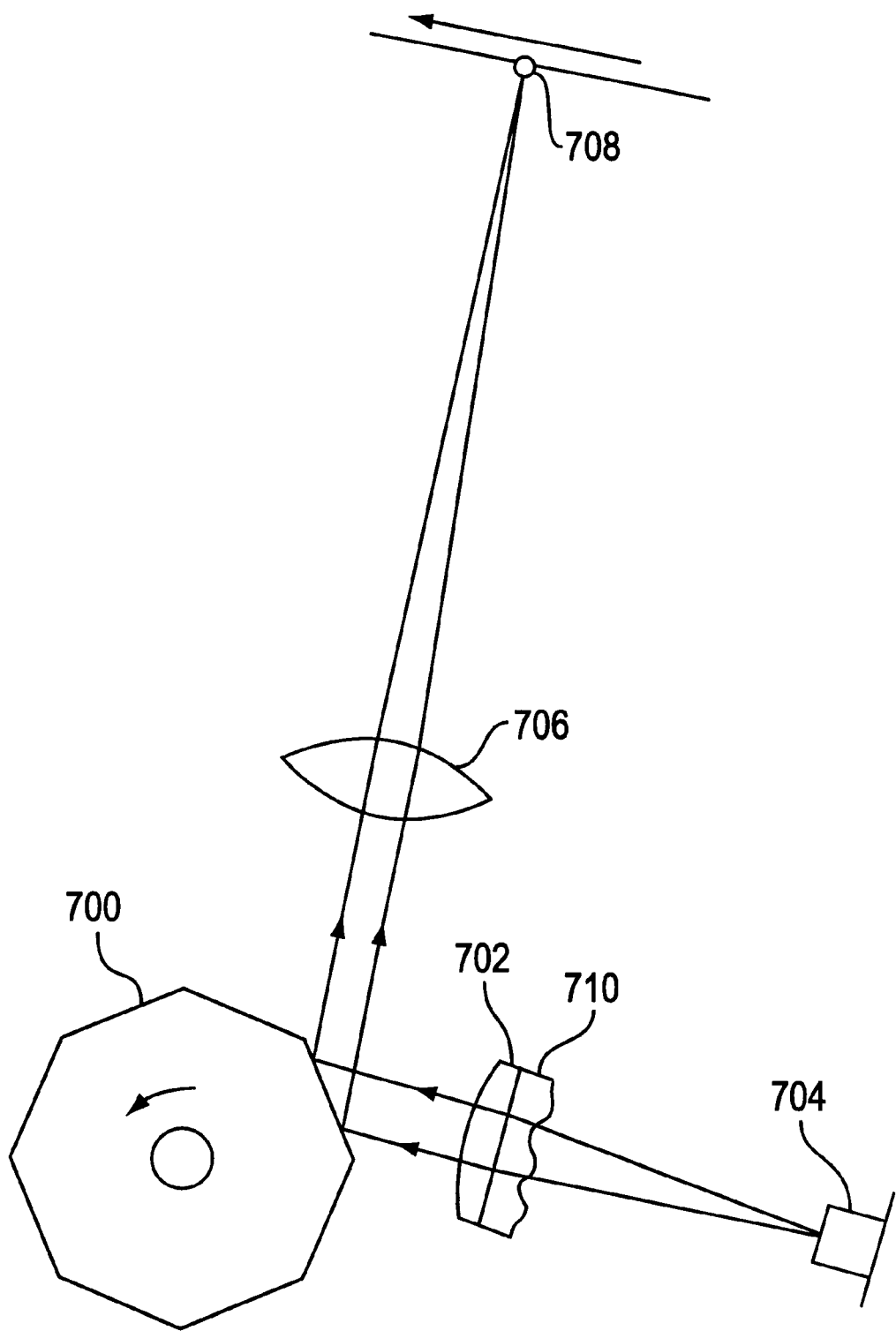
FIG. 18 is a schematic view of the arrangement of a laser beam printer device to which the holographic filter for superresolution above-mentioned is applied.

FIG. 18 shows a schematic arrangement of an example in which the superresolution filter above-mentioned is integrated with a flat-and-convex collimate lens 702 in a laser beam printer optical system using a polygon mirror 700. In FIG. 18, there are also shown a coherent light source 704 of a semiconductor laser, a focusing lens 706 and a superresolution spot 708.

As shown in FIG. 18, a replica 710 made of glass or resin serving as a superresolution filter is bonded to the flat face of the flat-and-convex collimate lens 702. Alternatively, such an arrangement may be made by forming a superresolution filter of glass or a plastic material integrally with the flat face of the flat-and-convex collimate lens 206 702.

In the arrangement above-mentioned, instead of the superresolution light source device in the light pickup head device according to each of the first and second embodiments of the present invention, a predetermined superresolution holographic filter may be applied to the collimate lens 106 in FIG. 1 or the collimate lens 206 in FIG. 4. It is a matter of course that the arrangement above-mentioned can be conveniently applied to any of a variety of conventional scanning optical systems such as laser scanning microscopes.

Further, it is apparent by those skilled in the art to use two pieces of the superresolution holographic filters above-mentioned as overlapping each other, thereby to form a sharper fine spot. In such an arrangement, it becomes necessary to design a second superresolution holographic filter such that, with respect to a beam diffracted from a first superresolution holographic filter, an optimum superresolution spot is obtained through the second superresolution holographic filter. However, such designing is a mere example of applications of the principle of the present invention discussed hereinbefore.

The superresolution holographic filter utilizes mere several interference patterns having an extremely long cycle as compared with a normal holographic optical element. The interference patterns can be precisely calculated by a computer to obtain the phase profile of a phase hologram, and the phase profile thus obtained can be reproduced on glass or a mold by cutting or polishing the same. It is a matter of course that a superresolution filter can be formed on a collimate lens face in such a manner.

We claim:

1. A superresolution filter for optical device comprising a holographic optical element, said holographic optical element having a hologram recorded on the surface thereof, said hologram presenting the waves of phase row light sources including first and second light sources from which lights are emitted in the form of waves of which phases are reverse to each other, said hologram being arranged such that, when diffracted light from said hologram is focused, a main lobe formed by said second light source is superposed on the lateral sides of a main lobe formed by said first light source.

2. A superresolution scanning optical device comprising a coherent light source, focusing means having a collimate lens for focusing a coherent beam emitted from said coherent light source on a recording surface of an optical disc, and control means for controlling the relative position of said focusing means with respect to said recording surface of said optical disc, said collimate lens having, in a unitary structure, a superresolution filter for optical device according to claim 1.

3. A superresolution scanning optical device comprising a coherent light source, focusing means having an objective lens for focusing a coherent beam emitted from said coherent light source on a recording surface of an optical disc, and control means for controlling the relative position of said focusing means with respect to said recording surface of said optical disc, said objective lens having, in a unitary structure, a superresolution filter for optical device according to claim 1.

4. A superresolution scanning optical device comprising a coherent light source and focusing means having a collimate lens, a polygon mirror and a focusing lens for focusing a coherent beam emitted from said coherent light source, said collimate lens having, in a unitary structure, a superresolution filter for optical device according to claim 1.

5. A superresolution scanning optical device comprising a coherent light source and focusing means having a collimate lens, a polygon mirror and a focusing lens for focusing a coherent beam emitted from said coherent light source, said focusing lens having, in a unitary structure, a superresolution filter for optical device according to claim 1.

6. A superresolution filter for optical device comprising a holographic optical element, said holographic optical element having a hologram recorded on the surface thereof, said hologram presenting the waves of phase row light sources including first and second light sources from which lights are emitted in the form of waves of which phases are reverse to each other, and a third light source presenting a phase reverse to that of said second light source, said hologram being arranged such that, when diffracted light from said hologram is focused, a main lobe formed by said second light source is superposed on the lateral sides of a main lobe formed by said first light source, and a main lobe formed by said third light source is superposed on the lateral sides of a main lobe formed by said second light source.

7. A superresolution scanning optical device comprising a coherent light source, focusing means having a collimate lens for focusing a coherent beam emitted from said coherent light source on a recording surface of an optical disc, and control means for controlling the relative position of said focusing means with respect to said recording surface of said optical disc, said collimate lens having, in a unitary structure, a superresolution filter for optical device according to claim 6.

8. A superresolution scanning optical device comprising a coherent light source, focusing means having an objective lens for focusing a coherent beam emitted from said coherent light source on a recording surface of an optical disc, and control means for controlling the relative position of said focusing means with respect to said recording surface of said optical disc, said objective lens having, in a unitary structure, a superresolution filter for optical device according to claim 6.

9. A superresolution scanning optical device comprising a coherent light source and focusing means having a collimate lens, a polygon mirror and a focusing lens for focusing a coherent beam emitted from said coherent light source, said collimate lens having, in a unitary structure, a superresolution filter for optical device according to claim 6.

10. A superresolution scanning optical device comprising a coherent light source and focusing means having a collimate lens, a polygon mirror and a focusing lens for focusing a coherent beam emitted from said coherent light source, said focusing lens having, in a unitary structure, a superresolution filter for optical device according to claim 6.

11. A superresolution filter for optical device comprising a holographic optical element, said holographic optical element having a computer-synthesized hologram recorded on the surface thereof, said computer-synthesized hologram presenting the waves of phase row light sources including first and second light sources from which lights are emitted in the form of waves of which phases are reverse to each other, said waves being calculated as an inline-type Fourier transform hologram, said hologram being arranged such that, when diffracted light from said hologram is focused, a main lobe formed by said second light source is superposed on the lateral sides of a main lobe formed by said first light source.

12. A superresolution scanning optical device comprising a coherent light source, focusing means having a collimate lens for focusing a coherent beam emitted from said coherent light source on a recording surface of an optical disc, and control means for controlling the relative position of said focusing means with respect to said recording surface of said optical disc, said collimate lens having, in a unitary structure, a superresolution filter for optical device according to claim 11.

13. A superresolution scanning optical device comprising a coherent light source, focusing means having an objective lens for focusing a coherent beam emitted from said coherent light source on a recording surface of an optical disc, and control means for controlling the relative position of said focusing means with respect to said recording surface of said optical disc, said objective lens having, in a unitary structure, a superresolution filter for optical device according to claim 11.

14. A superresolution scanning optical device comprising a coherent light source and focusing means having a collimate lens, a polygon mirror and a focusing lens for focusing a coherent beam emitted from said coherent light source, said collimate lens having, in a unitary structure, a superresolution filter for optical device according to claim 11.

15. A superresolution scanning optical device comprising a coherent light source and focusing means having a collimate lens, a polygon mirror and a focusing lens for focusing a coherent beam emitted from said coherent light source, said focusing lens having, in a unitary structure, a superresolution filter for optical device according to claim 11.

16. A superresolution filter of an optical device comprising a holographic optical element, said holographic optical element having a computer-synthesized hologram recorded on the surface thereof, said computer-synthesized hologram presenting the waves of phase row light sources including first and second light sources from which lights are emitted in the form of waves of which phases are reverse to each other, and a third light source presenting a phase reverse to that of said second light source, said waves being calculated as an inline-type Fourier transform hologram, said computer-synthesized hologram being arranged such that, when diffracted light from said hologram is focused, a main lobe formed by said second light source is superposed on the lateral sides of a main lobe formed by said first light source, and a main lobe formed by said third light source is superposed on the lateral sides of a main lobe formed by said second light source.

17. A superresolution scanning optical device comprising a coherent light source, focusing means having a collimate lens for focusing a coherent beam emitted from said coherent light source on a recording surface of an optical disc, and control means for controlling the relative position of said focusing means with respect to said recording surface of said optical disc, said collimate lens having, in a unitary structure, a superresolution filter for optical device according to claim 16.

18. A superresolution scanning optical device comprising a coherent light source, focusing means having an objective lens for focusing a coherent beam emitted from said coherent light source on a recording surface of an optical disc, and control means for controlling the relative position of said focusing means with respect to said recording surface of said optical disc, said objective lens having, in a unitary structure, a superresolution filter for optical device according to claim 16.

19. A superresolution scanning optical device comprising a coherent light source and focusing means having a collimate lens, a polygon mirror and a focusing lens for focusing a coherent beam emitted from said coherent light source, said collimate lens having, in a unitary structure, a superresolution filter for optical device according to claim 16.

20. A superresolution scanning optical device comprising a coherent light source and focusing means having a collimate lens, a polygon mirror and a focusing lens for focusing a coherent beam emitted from said coherent light source, said focusing lens having, in a unitary structure, a superresolution filter for optical device according to claim 16.

* * * * *

UNITED STATES PATENT AND TRADEMARK OFFICE
CERTIFICATE OF CORRECTION

PATENT NO.    : 5,978,109
DATED         : November 2, 1999
INVENTOR(S)   : Kato et al.

It is certified that error appears in the above-identified patent and that said Letters Patent is hereby corrected as shown below:

<u>Title page,</u>
After item [75], Inventors, insert -- Assignee: Matsushita Electric Industrial Co., Ltd., Osaka, Japan --.
Item [62], Related U.S. Application Data, change "08/034,754" to -- 08/034,750 --.

Signed and Sealed this

Twenty-ninth Day of July, 2003

JAMES E. ROGAN
*Director of the United States Patent and Trademark Office*